(12) United States Patent
Viswanathan et al.

(10) Patent No.: US 11,243,301 B2
(45) Date of Patent: Feb. 8, 2022

(54) SYSTEM, DEVICE AND METHOD FOR MOBILE DEVICE ENVIRONMENT SENSING AND USER FEEDBACK

(71) Applicant: Braze Mobility Inc., Toronto (CA)

(72) Inventors: Pooja Viswanathan, Mississauga (CA); Ilan Max, Thornhill (CA); Graham Browning, Toronto (CA)

(73) Assignee: Braze Mobility Inc., Toronto (CA)

( * ) Notice: Subject to any disclaimer, the term of this patent is extended or adjusted under 35 U.S.C. 154(b) by 277 days.

(21) Appl. No.: 16/317,110

(22) PCT Filed: Jul. 11, 2017

(86) PCT No.: PCT/CA2017/050840
§ 371 (c)(1),
(2) Date: Jan. 11, 2019

(87) PCT Pub. No.: WO2018/010024
PCT Pub. Date: Jan. 18, 2018

(65) Prior Publication Data
US 2019/0227154 A1 Jul. 25, 2019

Related U.S. Application Data

(60) Provisional application No. 62/361,116, filed on Jul. 12, 2016.

(51) Int. Cl.
*G01S 7/64* (2006.01)
*A61G 5/10* (2006.01)
(Continued)

(52) U.S. Cl.
CPC ............... *G01S 7/64* (2013.01); *A61G 5/10* (2013.01); *G01S 15/93* (2013.01); *G01S 15/931* (2013.01);
(Continued)

(58) Field of Classification Search
CPC .......... G01S 7/64; G01S 15/93; G01S 15/931; G01S 15/876; A61G 5/10; A61G 2203/40; A61G 2203/72
(Continued)

(56) References Cited

U.S. PATENT DOCUMENTS

| 6,108,592 A | 8/2000 | Kurtzberg et al. |
| 6,268,803 B1 | 7/2001 | Gunderson et al. |

(Continued)

FOREIGN PATENT DOCUMENTS

WO 2015/143273 9/2015

OTHER PUBLICATIONS

EP17826726.6 Extended European Search Report dated Feb. 28, 2020 (8 pages).

*Primary Examiner* — Daniel L Murphy
(74) *Attorney, Agent, or Firm* — Bereskin & Parr LLP/S.E.N.C.R.L., s.r.l.; Isis E. Caulder; Ryan De Vries

(57) ABSTRACT

The present disclosure describes a system, device, and method for assisting a user to avoid contacting surfaces with their mobile device. An environment is sensed with one or more electronic sensors. The sensor readings are analyzed. Information is then provided to a user based on the analyzed sensor readings. The sensors may be configured so their sensor cones cross at a midpoint. Readings from the sensor(s) may be grouped according detection zone(s) corresponding to one or more areas about a mobile device. A computing module may control a feedback module according to detection zone readings. The feedback module may comprise an indicator for each detection zone. The indicator may be a vibration motor. The indicator may be a light. The computing module may set the colour of a light and/or control the vibrations based on the proximity of surfaces detected within the corresponding detection zone.

20 Claims, 16 Drawing Sheets

(51) Int. Cl.
*G01S 15/93* (2020.01)
*G01S 15/931* (2020.01)

(52) U.S. Cl.
CPC ...... *A61G 2203/40* (2013.01); *A61G 2203/72* (2013.01)

(58) Field of Classification Search
USPC .......................................................... 367/111
See application file for complete search history.

(56) References Cited

U.S. PATENT DOCUMENTS

| | | | |
|---|---|---|---|
| 2004/0049344 A1* | 3/2004 | Simon | G08G 1/161 |
| | | | 701/301 |
| 2005/0168331 A1 | 8/2005 | Gunderson | |
| 2008/0180267 A1 | 7/2008 | Kaneko et al. | |
| 2011/0130940 A1 | 6/2011 | Smithers et al. | |

* cited by examiner

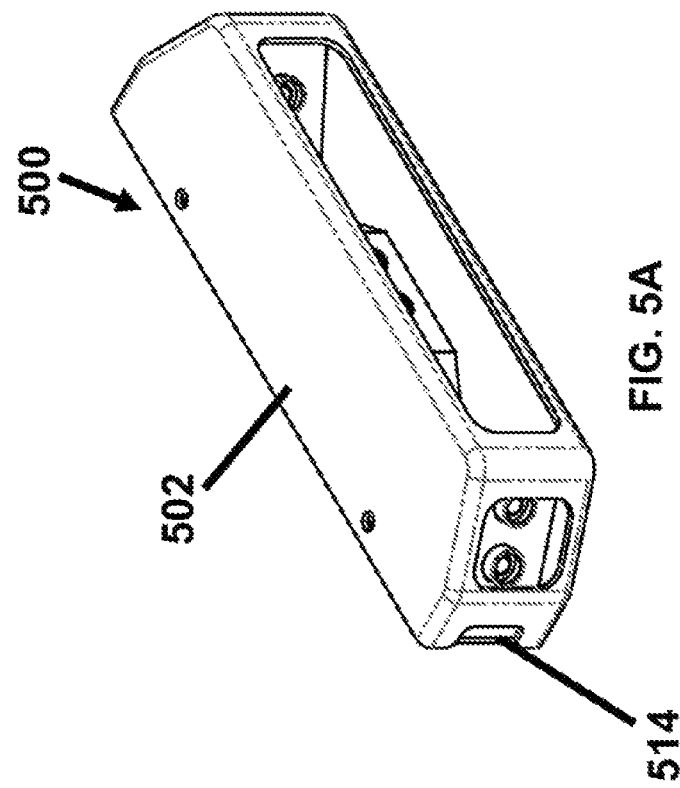
FIG. 5A
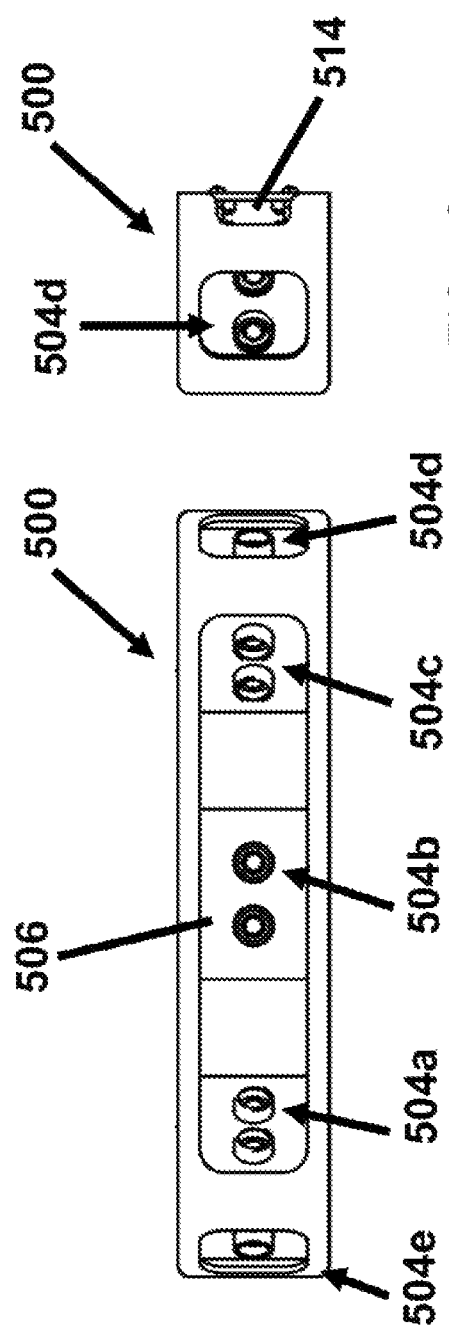
FIG. 5C
FIG. 5B
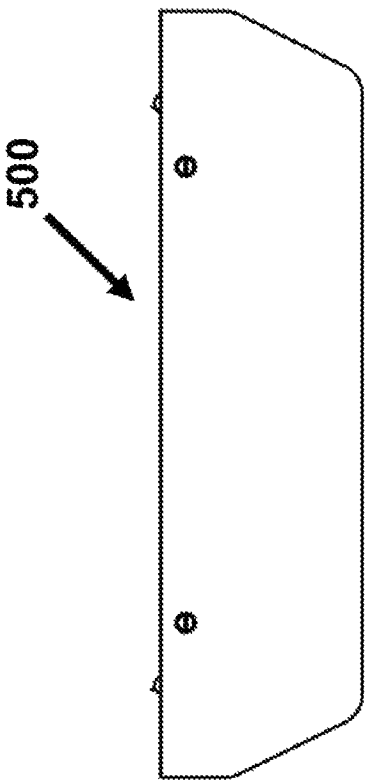
FIG. 5D

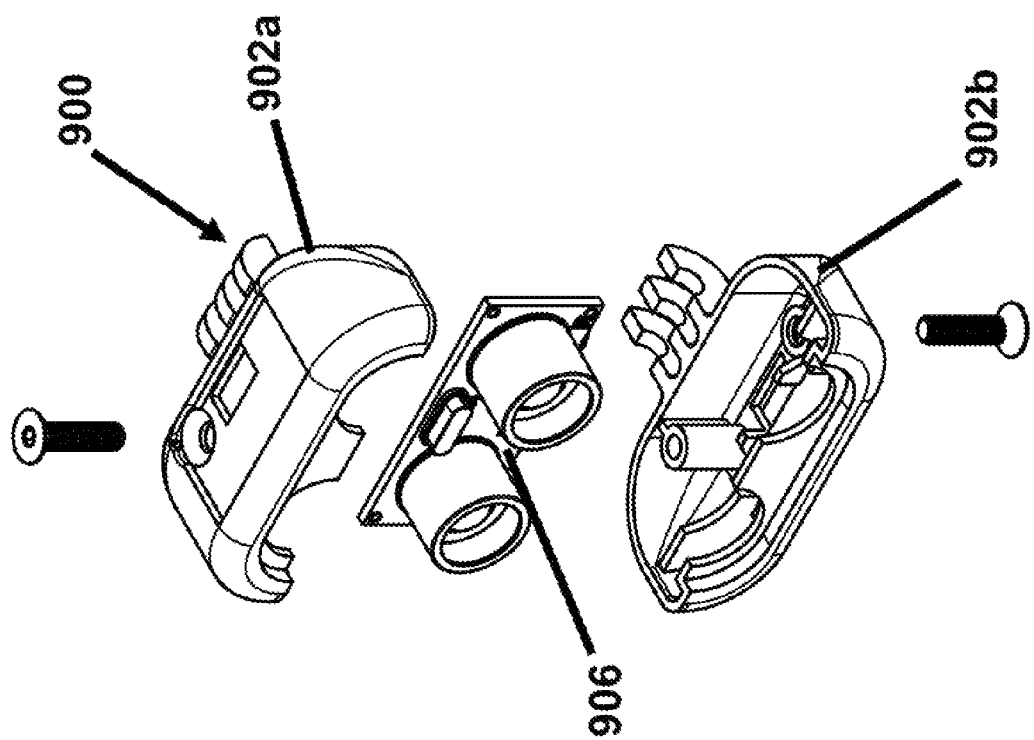

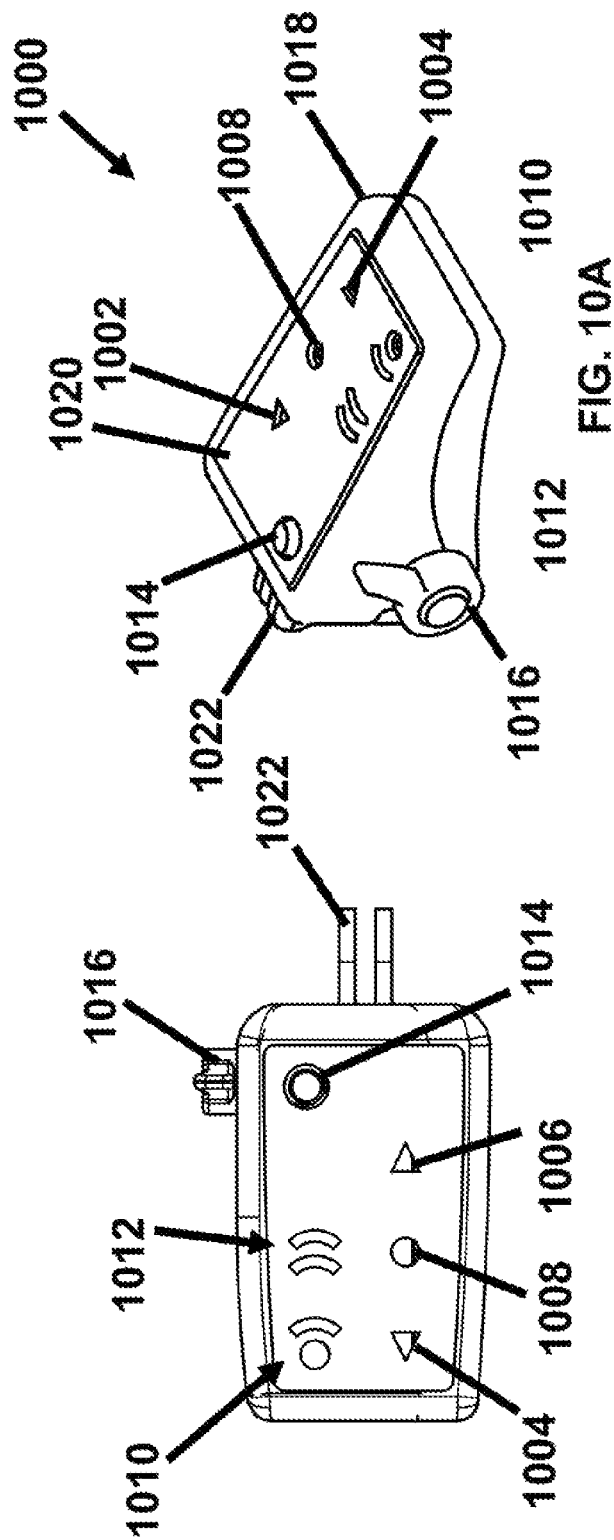
FIG. 10A
FIG. 10B
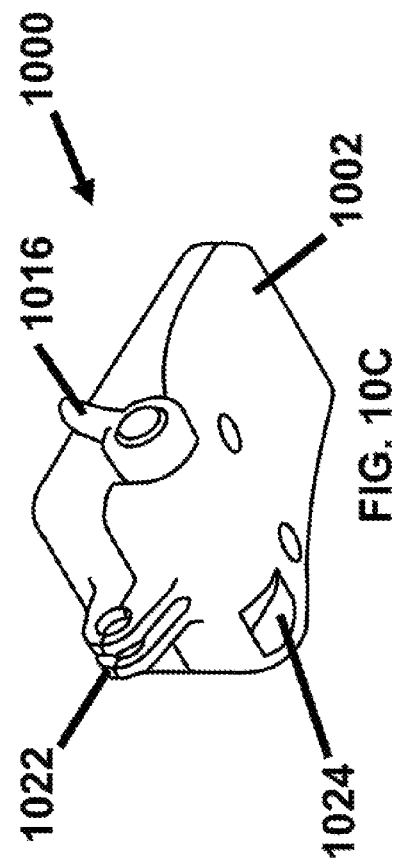
FIG. 10C
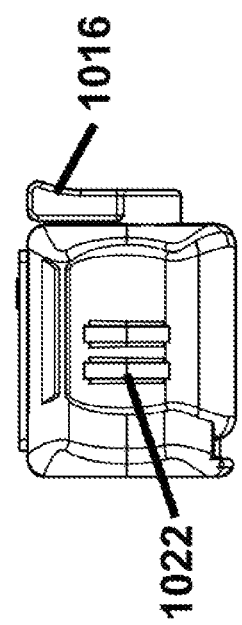
FIG. 10D

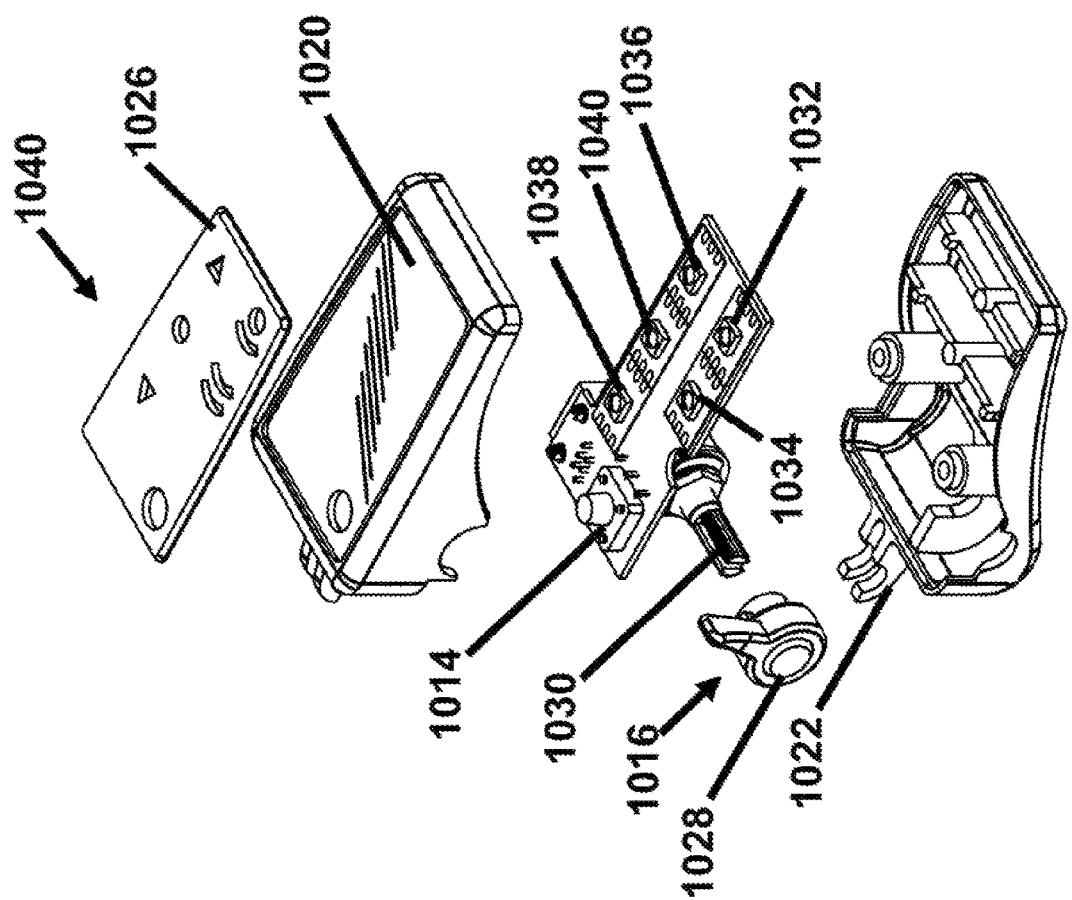

SYSTEM, DEVICE AND METHOD FOR MOBILE DEVICE ENVIRONMENT SENSING AND USER FEEDBACK

CROSS-REFERENCE TO RELATED APPLICATION

This application is a § 371 national phase of International Application No. PCT/CA2017/050840, filed on Jul. 11, 2017, which claims priority to U.S. Provisional Patent Application 62/361,116, filed on Jul. 12, 2016, each of which is incorporated by reference herein in its entirety.

FIELD

The present disclosure relates to the field of environment sensing. More particularly, the present disclosure relates to surface proximity detection and feedback for users of mobile devices, including mobility devices, mobile robotics, and remote control applications.

BACKGROUND

Collision of a mobile device (such as a wheelchair, walker and scooter, robot, and remote control device) with objects (including people and animals) within their environment may cause physical harm and property damage, both to the mobile device and the surrounding objects. Physical injury may be suffered by the driver/user of the mobile device and other people within the vicinity of the mobile device. In certain cases, a collision by a user may result in the loss of mobile device usage privileges.

Collisions with a mobile device can also have negative psychological consequences for mobile device users. Users may feel self-conscious about their driving abilities. Collisions may exacerbate a users' self-consciousness and even cause embarrassment and reduce mobile device usage.

A system, device, and method for helping users avoid collisions with their mobile devices is desirable.

BRIEF DESCRIPTION OF THE FIGURES

FIGS. 5A-D show various view of another embodiment of a sensor module in accordance with this disclosure.

FIGS. 9A-E show various views of another embodiment of a sensor module 900 in accordance with the present disclosure.

FIGS. 10A-E show various views of a feedback module in accordance with an embodiment of the present disclosure.

DETAILED DESCRIPTION

The present disclosure describes a system, device, and method for helping a user avoid contacting surfaces with their mobile device. The system, device, and method sense the environment using one or more electronic sensors, process the sensor readings, and provide information to the user via one or more feedback modules about the proximity of surfaces within the environment. The sensors may be ultrasonic sensors. The system, device, and method may be used with mobile devices such as mobility devices to assist a user with moving, and with controlling robots. The sensors may be configured so their sensor cones cross at a point. Readings from the sensor(s) may be grouped according to detection zone(s) corresponding to one or more areas about a mobile device. A detection zone may have overlapping sensor cones. The detection zones may overlap one-another for a particular area. A computing module may control a feedback module according to detection zone readings. The feedback module may comprise an indicator for each detection zone. The indicator may be a vibration motor. The indicator may be a light. The computing module may set the colour of a light based on the proximity of surfaces detected within the corresponding detection zone.

In an embodiment of the present disclosure, the system comprises a sensor module comprising one or more sensors, each sensor configured to detect the proximity of an object to the sensor; a controller configured to control the sensors and analyze the data received from the sensors; and a user feedback module for providing information regarding the proximity of the sensors to an object based on the data analyzed by the computing module.

In an embodiment, the system comprises a sensor module comprising a one or more ultrasonic sensors, each sensor comprising an ultrasonic transmit transducer and an ultrasonic receive transducer, each sensor for detecting the proximity of an object to the sensor; a computing module for controlling the sensor module and analyzing the data from the sensor modules; and a user feedback module for providing information to a user of a mobility device regarding the proximity of the mobility device to an object based on the sensor data analyzed by the computing module.

Figure 1:
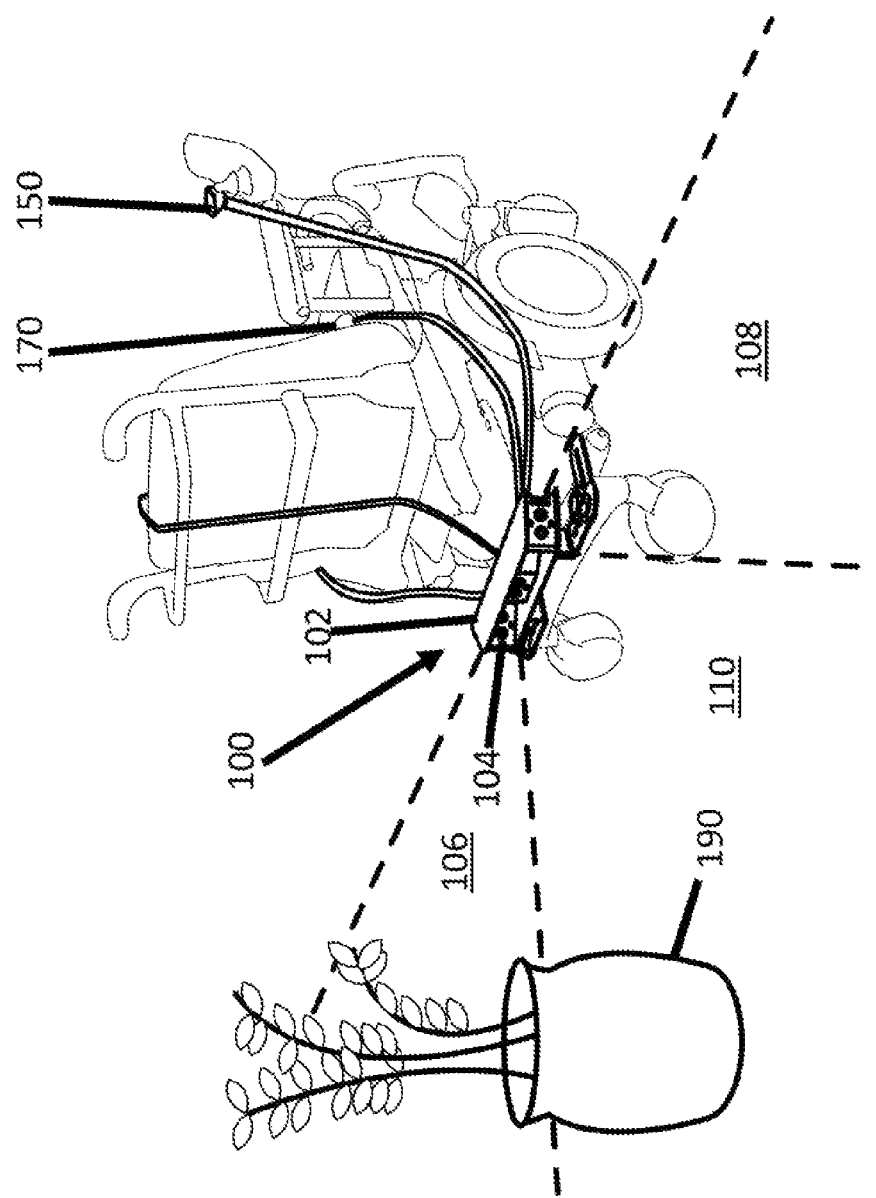
FIG. 1 shows perspective view of a system in accordance with an embodiment of the present disclosure attached to a mobile device.

FIG. 1 shows a perspective view of a system 100 in accordance with an embodiment of this disclosure attached to a mobile device. The system 100 comprises a sensor module 102 and a feedback module 150. The sensor module 102 is mounted on a location of the mobility device. FIG. 1 shows the sensor module 102 mounted on the bottom rear of a wheelchair. The feedback module 150 is mounted on the joystick of the wheelchair. The sensor module 102 is in communication with the feedback module 150. The sensor module 102 is electrically connected to the feedback module to exchange data. The sensor module 102 may, however, have a wireless connection to exchange data wirelessly.

The sensor module 102 comprises a controller (also referred to herein as a computing module). The controller may be a central processing unit or processor. The feedback module 150 may also comprise a controller/computing module which may interface with the controller/computing module of the sensor module 102.

Each of the sensors 104 in the sensor module 102 detects a surface of an object 190 if that surface is within the area or range covered by the respective sensor 104. The sensors 104 each communicate their readings to the controller as data. The vicinity being monitored by the sensors 104 may be the area which is difficult for a user of a mobility device to view, such as the area behind the mobility device. FIG. 1 shows the sensor module 102 mounted to the back of an electrical wheelchair. Accordingly, the system 100 is setup to monitor the vicinity or area behind the wheelchair. The system 100 can also be configured to monitor the vicinity or areas in front of or on the sides of the wheelchair for users. These alternate or supplemental locations can be helpful for users who, for example, have low vision, including low peripheral vision and visual neglect.

The computing module receives the data from the sensor module 102, analyzes that data, then communicates information to the user based on the data analysis using the feedback module 150. In an embodiment, the data comprises information about the proximities of surfaces of the object 190 relative to the corresponding sensors 104. That proximity information may be actual distances to the surfaces of the object 190 relative to the sensors 104 or some other reference point. The proximity information is used to communicate to the user of the mobility device the proximity of the object 190 relative to one or more reference points, such as one or more location on the mobility device. The sensor module 102 of FIG. 1, for example, comprises multiple ultrasonic sensors 104 along its length. This permits detection of surfaces of object(s) relative to the entire width of the back of the wheelchair. When and the way this proximity information is communicated to the user depends on the feedback module 150 and/or computing module configuration. In FIG. 1, the computing module combines the readings from the multiple sensors 104 to detect the locations of the surface of object 190 within three detection zones or regions of the back of the wheelchair: a left region 106, a right region 108, and a middle region 110. The computing module then sends data, such as RGB values and pulse intensity/duration, to the feedback module 150 corresponding to each zone or region. The data is sent via the wire connection, but may be sent wirelessly.

Figure 2:
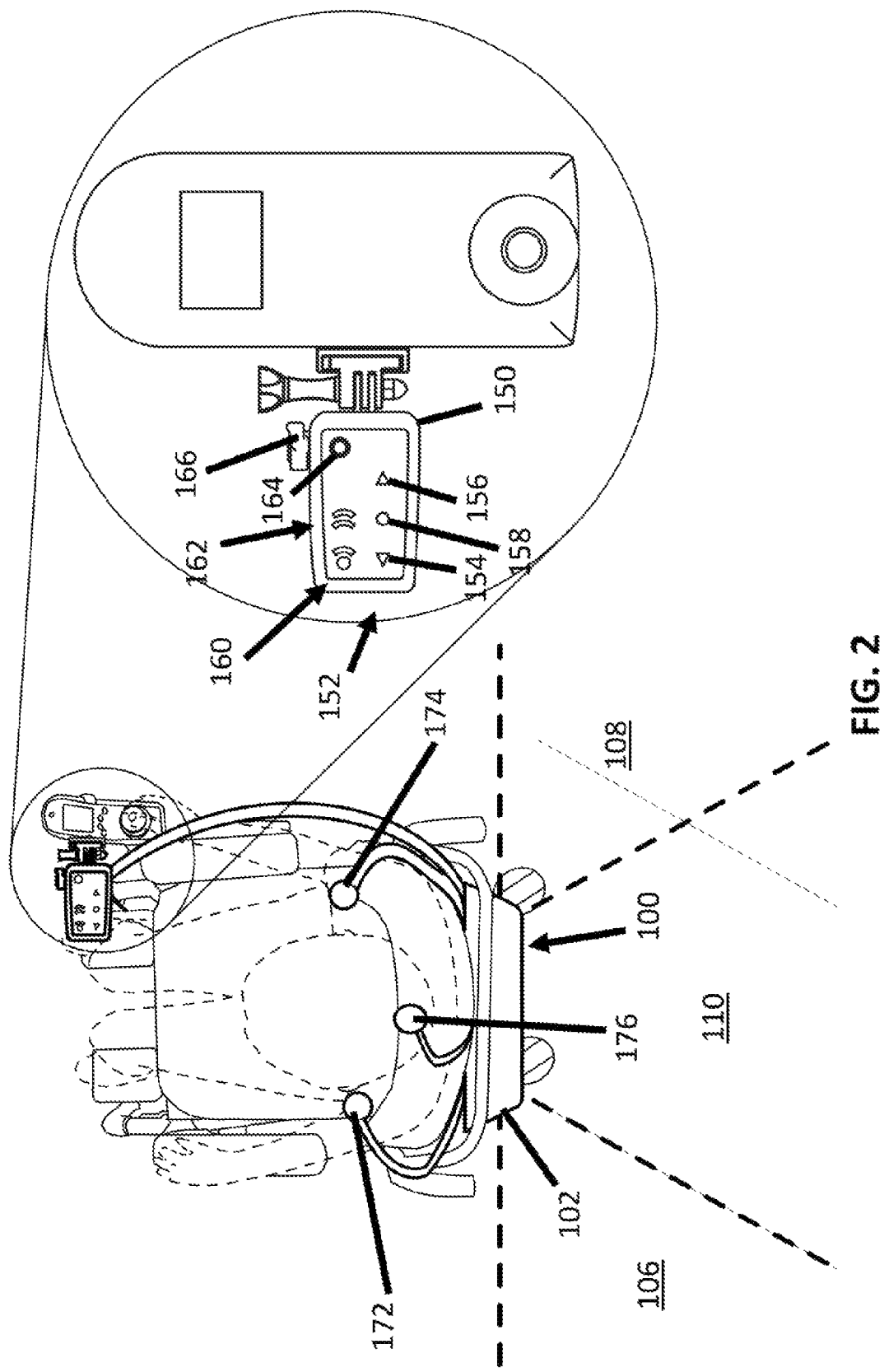
FIG. 2 shows a top view of the system of FIG. 1.
Figure 3A:
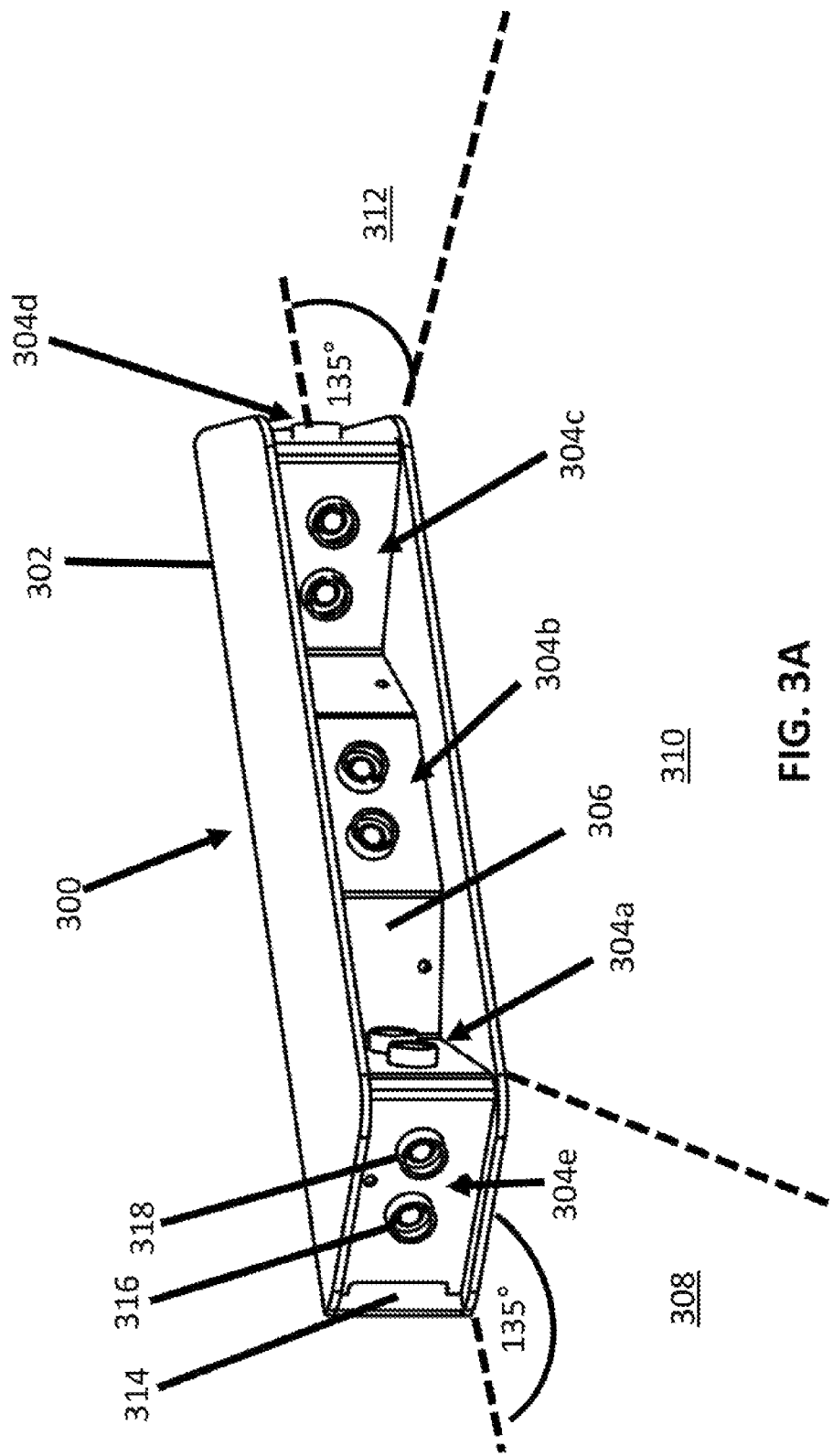
FIGS. 3A-D show various views of a sensor module in accordance with an embodiment of this disclosure.
Figure 3B:
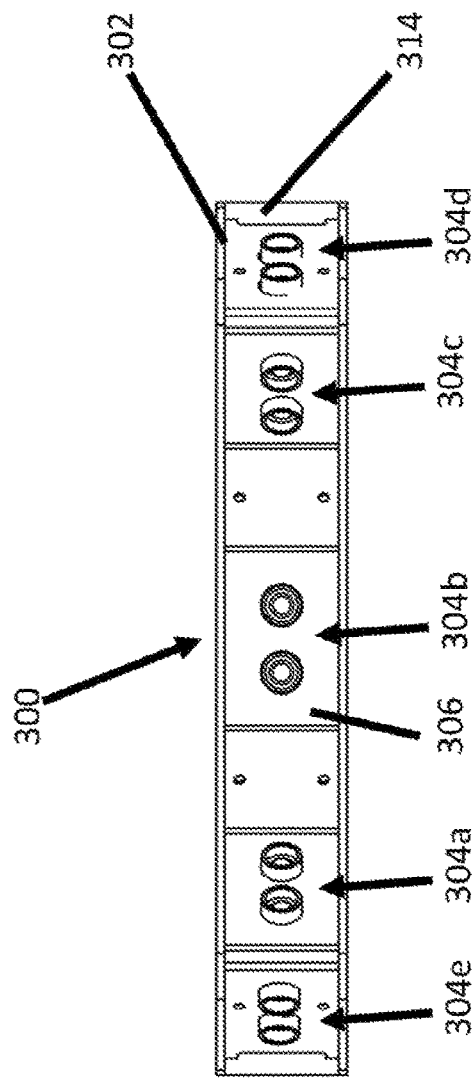
Figure 3C:
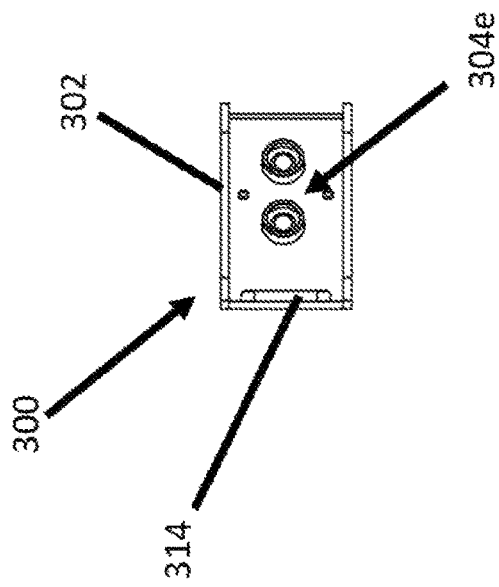
Figure 3D:
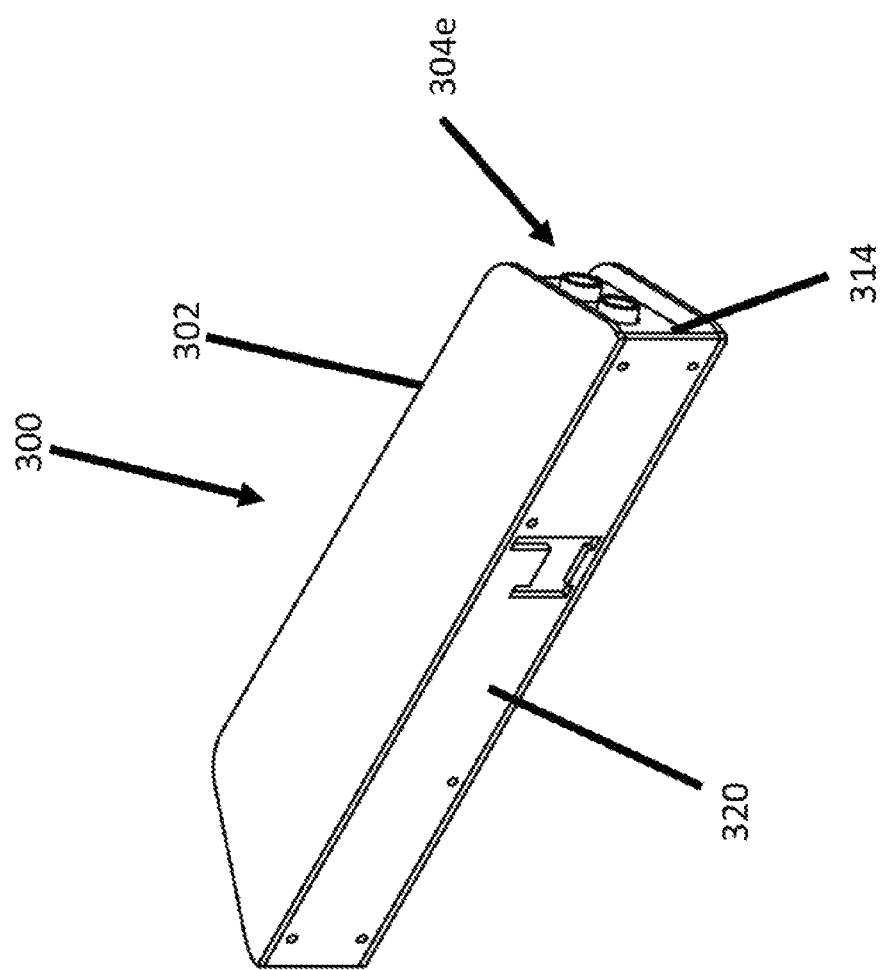

FIG. 2 shows a top view of the system 100 of FIG. 1 mounted to a mobility device, with feedback modules 150, 170 in greater detail. The feedback module 150 comprises a light module 152. The light module 152 comprises a left light 154, a right light, 156, and a middle light 158. The lights may be light emitting diodes (LEDs). Each LED may show the status to a user for a particular detection zone being monitored by the sensor module 102. The colour of each of the lights 154, 156, 158 may correspond to a proximity range within which the sensors 104 detected the surfaces of object(s) in each of the detection zones 106, 108, 110. The proximity ranges may be relative to a location on the sensor module 102, such as the receiver of the sensor 104. For example, the entire surface of the planter 190 of FIG. 1 is in the middle detection zone 110. In a configuration of the controller, this may cause only the middle light 158 to illuminate a particular colour. The left light 154 and the right light 156 would not illuminate because there is no object within the corresponding detection zone 106, 108. As further described below, the computing module aggregates the sensor readings into a particular output.

The colour of the middle light 158 depends on the minimum of the distances between the sensors 104 monitoring the middle region 110 and the surface of the planter 190. If the distances decrease, the middle light 158 may change colour in real-time (or close to real-time) to indicate to a user that the surface of the planter 190 is getting closer. For example, the colour sequence may be green for objects that are relatively far away, yellow for objects that are midrange, and red for objects that are very close, relative to a point on the sensor module 102 corresponding to the detection zone. This point is a proxy for a point on the mobility device. In an embodiment, the controller comprises a memory with a mapping of proximity/distance range(s) to light colour(s).

In an embodiment, the mapping is as follows:

| Light Colour | Short Range Mode Range Threshold | Long Range Mode Distance Thresholds |
|---|---|---|
| Off | >3 feet | >15 feet |
| Green | 3-1 feet | 15-6 feet |
| Yellow | 12-4 inches | 1-6 feet |
| Red | <4 inches | <1 foot |

The applicant has found this three light display to be one way to represent to the user the environment within a 180-degree field of view of the mobility device. This light system indicates to the user whether an object is present within the detection areas, how close the object is to the mobility device, and the location of the object relative to the mobility device.

The feedback module 150 also comprises mode lights 160, 162 and a mode switch 164. The mode switch 164 is used by a user to change between three different system modes: short range, long range, and off. The mode lights 160, 162 are illuminated according to the system mode. In short range mode, only light 160 is illuminated/on. In long range mode, both lights 160, 162 are on. In off mode, none of the lights are on.

It is important for a user to have a persistent indicator of whether the system 100 is on or off. This is especially true when the lights of the light module 152 are off when no object is within the sensor 104 zones. If a user thinks the system 100 is on when it is actually off, the user could mistakenly think that no object is within the vicinity of the sensor module 102. This could result in injury or damage to property.

It can also be helpful to a user to have a long range system mode and a short range system mode which can be selected depending on the user's environment. In long range mode, the system 100 is configured to have greater/larger object proximity thresholds than in short range mode. In other words, in long range mode, the system 100 may monitor a further distance away from the sensors 104 than in short range mode. By contrast, in short range mode, the system 100 may provide a user with greater precision information as to the distance of an object from the sensors 104. Long range mode would be helpful with detecting objects in high-speed environments such as sidewalks and roadways. If objects are approaching at a greater speed, the user needs to be alerted when those objects are a further distance away so that the user has sufficient time to react. Indeed, the system, device and method of the present disclosure may be used in applications to detect objects moving towards or away from a stationary mobile device is stationery. Short range mode would be helpful with detecting objects in a close-proximity environment such as a house or an office. In such environments, objects are typically not approaching the mobility device at a high speed. Rather, the user needs to have greater precision information so that they can navigate their mobility device through tight spaces and next to objects which are very close to the mobility device, and potentially on opposite sides of the device at the same time. For example, in long range mode, the system 100 may be configured to illuminate the middle light 158 red for any object that is within 5 feet or less of a point of the sensor module 102. In short range mode, however, the system 100 may be configured to illuminate the middle light 158 green for any object between 1 and 3 feet, yellow for any object between 3 inches and 1 foot, and red for any object less than 3 inches, away from a point on the sensor module 102. Many mobility devices are unique in that they need to be operated in different types of environments and can transition between different environments quickly and seamlessly (i.e. entering a building from the street).

In an embodiment in accordance with the present disclosure, the user may configure a distance threshold corresponding to a light colour for a particular detection zone by navigating the sensor mobility device to a select distance from a reference object for the detection zone, and indicating to the system 100 (such as pressing a button on the feedback module 150) that the selected distance is the new threshold distance (or boundary) for that detection zone and mode.

The mode switch 164 may be a button that can be pressed to cycle through the modes. A press can be functionally easier for a greater number of users, since some users may not have good motor control of their hands to move a particular switch between locations. A button, however, allows the users to press with whatever body part is feasible—including their head. This switch 164 may be physically located on the feedback module 150 or be connected through a wire to the feedback module 150 to allow users to plug in their own switches (e.g., buttons or proximity switches) that they might be more comfortable with using and allow for placement in an alternate preferred location.

The system 100 also comprises a second feedback module 170. The second feedback module 170 is a haptic module to provide haptic feedback to the user. The haptic module 170 may comprise one or more vibrator motors or other types of electronic devices which produce a vibration, generally referred to herein as vibration devices. The vibration devices are turned on and off to provide touch-based information to the user about the environment being sensed by the system 100.

In an embodiment, the haptic module 170 comprises three vibration motors: a left vibration motor 172, a right vibration motor 174, and a middle vibration motor 176. The vibration motors are located on the seat cushion of the wheelchair. The vibration motors 172, 174, 176 may be located, however, in any location such as on the back rest, and the arm rest. The locations of the vibration motors may be selected by the user. The locations may be dictated by the user's needs. The on/off sequence, intensity, and/or duration of the vibration motors 172, 174, 176 depend on the sensor 104 data and the configuration of the controller. The control of each of the vibration motors 172, 174, 176 may correspond to objects within a particular detection zone or region 106, 108, 110 covered by the sensor module 102.

The haptic module 170 may be controlled by the computing module. In an embodiment, a vibration motor cycles on for a brief period when a particular event occurs or a condition is met for the detection zone 106, 108, 110 corresponding to the vibration motor. The event or condition may be the detection of a surface of an object at a threshold distance. The vibration cycle may last 1 second. The event or condition may be the surface of an object getting incrementally closer, such that at each increment the vibration produced by the vibration motor increases in intensity and/or duration. In an embodiment, the vibration may be timed to occur with the changing of the colour of the corresponding light in the light module 152. For example, as a user reverses their wheelchair closer to the planter 190, the middle light 158 changes from green to yellow when the planter is a particular threshold distance from the sensors 104 monitoring the middle detection zone 110. At the moment or the distance threshold at which the middle light 158 changes colour, the middle vibration motor 176 may turn on for 1 second. In this way, the vibration motor provides non-visual feedback to the user about a change in the environment being monitored by the system 100. Although transitory, this non-visual feedback can be sufficient to prompt the user to look at the light module 152 to get a better sense of proximity to the object relative to the different locations of the mobility device. The light module 152 provides persistent feedback to the user. The combination of the haptic module 170 with the light module 152 allows a user of a mobility device to look away from the light module 152 but be prompted to look back at the light module 152 when an object approaches. Although the vibration motor 172, 174, 176 predominantly creates a touch-based signal, it may also provide an auditory signal to the user. The combination of a visual feedback module and a haptic feedback module can allow the user to develop cognitive adaptations to the feedback stimulus. In this way, a user may eventually perceive their senses as extending beyond their physical body and reaching into the mobility device, itself. Indeed, feeling a vibration can seem very similar to brushing up against an object. Vibrations can, accordingly, be a very intuitive way to provide information to a user about their environment. Vibrations may be processed by a user more quickly than a visual stimulus, alone.

The feedback module 150 also comprises a vibration control 166. In an embodiment, the vibration control 166 is a knob which is turned to a particular setting to increase or decrease the intensity of the vibrations of the vibrator module 170. Users may want to change the intensity of the vibrations periodically. This can be helpful when changing between different environments or when wearing different thicknesses of clothing. For example, a user may want a high intensity vibration setting when using their mobility device in a noisy or bumpy environment, such as a mall or a bumpy road, respectively. A user may want a low intensity vibration setting, however, when using their mobility device in a quite or smooth-rolling environment, such as a library or a carpeted office, respectively. Some users may also be sensitive to vibrations or have changing sensitivities to vibrations. For example, a user with cerebral palsy may have a spastic episode in response to higher-intensity vibrations. The level of vibrations that triggers a spastic episode in a particular user may also vary from day-to-day.

The computing module may comprise a memory containing a program having instructions which are executed by a processor. The computing module may communicate the results of the analysis to a feedback module 150 as data. Based on the data from the computing module, the feedback module 150 may provide a user of the system 100 with information about the proximity and/or location of objects within the vicinity of the system. The system/device may be powered by an internal or external battery, or the power source of the mobility device, itself, through existing or custom ports.

FIGS. 3A-D show various views of a sensor module 300 in accordance with an embodiment of the present disclosure. The sensor module 300 comprises a housing 302 and one or more sensors 304a, 304b, 304c, 304d, 304e. The sensor module 300 may also comprise a sensor support structure 306. The sensor support structure 306 is for retaining the sensors 304a-e in a certain positions within the housing 302. The sensor support structure 306 may form and be integrated with the housing 302 such that the housing 302 and the sensor support structure 306 are one integrally-formed piece.

The sensor module 300 may contain an internal processor, and/or an interface for communication with an external processor. The sensor support structure 306 holds each of the sensors 304a-e at a particular angle relative to the sensor module 300 and each other, respectively. The support structure 306 may be configured to permit the user or an installer to adjust the angles of the sensor 304a-e from time-to-time. In an embodiment, servo motors are mechanically connected to the sensors so that their angles may be independently adjusted by the user or automatically by a processor according to a particular algorithm. The ability to adjust the angles after installation of the system 300 on the mobility device may assist with compensating for the tilt of the mobility device or sensor module 300, for example, to help ensure that the angle of the sensors 304a-e to the ground plane remains consistent.

The sensors 304a-e in the sensor module 300 may be configured, arranged, or positioned in the sensor module 300 in such a way so as to create one or more detection zones 308, 310, 312 about the sensor module 300. The detection zones 308, 310, 312 divide up a portion of the area around the sensor module 300 that all of the sensors 304a-e, collectively, can detect objects within.

In accordance with the sensor module 100 of FIG. 1, the ultrasonic sensors 304a-e are arranged to form three detection zones 308, 310, 312. Each sensor may be able to detect the surface of an object within a cone-shaped volume, the tip of which commences at or close to each sensor face, and the cone of which extends outward from the face of the sensor. This is also referred to herein as a sensor cone. Although many surfaces may fall within a sensor cone for a particular ultrasonic sensor, the ultrasonic sensor may only identify, record, and/or communicate the surface closest to the sensor face. Sensors 304e and 304d are each positioned on opposite sides of the sensor module 300. Sensors 304e and 304d may each be positioned at an angle of 45 degrees relative to the back plane 320 of the sensor module 300, the sensors each facing outwards. Sensors 304a and 304c are positioned on the front of the sensor module 300. Sensors 304a and 304c may each be positioned at an angle that is anywhere between 15 degrees and 60 degrees relative to the back plane 320 of the sensor module 300. In an embodiment, sensors 304a and 304c are each angled inward by 20 degrees. Sensor 304b is positioned on the front of the sensor module 300. Sensor 304b may not be angled in any direction relative to the back plane 320 of the sensor module 300.

As shown in FIG. 3, multiple ultrasonic sensors 304a-e with overlapping cone-shaped volume coverage of a particular area may be used to detect the surface of an object in a detection zone. The overlapping areas of coverage by the sensors can provide increased reliability through sensor reading redundancy. A single sensor may give inaccurate readings, such as about the existence and/or distance of a surface of an object in its detection area, depending on the position and/or angle of the sensor face relative to the object, the shape of the object, the height of the object, and/or the material of the object. Individual sensors my also fail. Individual sensors may also periodically have incorrect readings due to electro-magnetic interference. Inexpensive ultrasonic sensors can be prone to incorrect readings and poor quality readings, especially for surfaces that are at an angle that is not parallel to the face of the sensor. Overlapping sensor detection areas, however, can help provide redundancy to reduce the effect of one sensor having an incorrect reading. Using multiple sensors, each sensor with its face at a different angle from the other sensor faces, can help detect surfaces at a variety of angles. Overlapping sensor detection areas can also increase the total area or volume viewable by all of the sensors, collectively. The total horizontal planar area within which the sensors can detect an object (also referred to as viewable area), collectively, may be 180 degrees relative to the backplane 320 of the sensor module 300. For example, the readings from sensors 304e may be used to detect objects within detection zone 308; the readings from sensors 304a, 304b, and 304c may be used to detect objects within detection zone 310; and the readings from sensor 304d may be used to detect objects within detection zone 312.

The number of sensors used in the system may depend in part on the type(s) of sensor(s) being used, and/or the information required. For example, a single LIDAR sensor may be used to obtain detailed information about the distances of all surfaces within a full 180 degree field of view. LIDAR sensors, however, may be 50 to 100 times the cost of an ultrasonic sensor. In an embodiment, a plurality of inexpensive ultrasonic sensors are used in the system 100. Even though multiple ultrasonic sensors are used, the cost of those sensors, collectively, may still be significantly less than a single LIDAR sensor. Although significantly less expensive, using the multiple ultrasonic sensors in a particular configuration may still provide the data that is required to notify the user about objects within their vicinity at the necessary resolution.

In an embodiment, the computing module is configured with an algorithm which assigns one or more sensors to a selected detection zone. The algorithm might identify the minimum of distance/proximity reading between all sensors assigned to the detection zone. That minimum distance/proximity reading may be used as the single/unitary value to control the portion of the feedback module(s) providing information to the user about the corresponding detection zone. The algorithm may smooth the sensor readings (e.g. by taking a rolling average for a period of time, or waiting for at least a certain number of readings within a new distance threshold) to help ensure that if an object is in the middle of two distance thresholds, the feedback module(s) do not rapidly switch back and forth between two ranges. This smoothing may only occur when the current distance reading is greater than the previous reading. If the current distance reading is smaller than the previous distance reading, no smoothing may be desired so that the user is immediately notified of an object that may be closer. Such a conservative approach to sensor reading filtering can be important for mobility applications where physical harm or property damage can result if an object is actually closer than the distance identified to the user.

The sensor module may be attached at various locations on a mobility device. For example, the sensor module 300 may be attached to the base of the back of the mobility device (as shown in FIG. 1), or the top of the back portion of the backrest of the mobility device. Being able to attach the sensor module 300 to different locations of a mobility device increases the likelihood of finding a location that permits multiple sensors 304a-e to have an unobstructed view of a select area of interest. There are many types of mobility devices. For example, mobility devices may include wheelchairs, motorized wheelchairs, scooters, walkers, devices for assisting users with standing from a seated position and walking, canes, bicycles and motorized bicycles. Having the flexibility to mount the sensor module at different locations on a particular mobility device helps accommodate the different structures of mobility devices and/or the unique physical requirements of the user. Examples of potential locations at which to mount a sensor module 300 include, but are not limited to, the backrest, base, seat pan, arm rest, leg rests, or other accessories such as mounts and trays of a mobility device. The sensor module 300 may be fastened to the mobility device using one or more of the following: fabric fasteners/straps, adhesives, and rigid couplers. The system 100 may comprise spacers and/or supports to help position the sensor module 102 on the mobility device, and set the attitude of the sensor module 102 relative to the mobility device.

The system, device, and method of the present disclosure may also be used in other applications which have similar object detection requirements, such as remote controlled robots such as telepresence robots. The sensor module may be attached or mounted to a robot to provide feedback/information to the user of that robot to help the user navigate the robot around obstacles within the vicinity of the robot. Similar to a mobility device application, robots may need to be navigated through obstacles which are very close in proximity to the robot. The user may be operating the robot locally or remotely. The system, device and method of the present disclosure may help augment or supplement other environment sensing equipment, such as a video monitor.

Users of mobility devices may need supplemental or augmented information about the environment behind their mobility device. A mobility device may physically restrict a user from rotating their body relative to the mobility device to see what objects are behind the mobility device. A user may also not have the physical ability to rotate their body relative to the mobility device. Even if a user can rotate, the mobility device (or objects hanging off the mobility device such as a backpack) may partially or completely block the user's view, especially the area/region in very close proximity to the back of the mobility device. A user may also have visual impairment which would further reduce the user's ability to see what is behind their mobility device. In an embodiment in accordance with this disclosure, a sensor module 300 is mounted to the back of a mobility device to monitor the area behind the mobility device. Users of mobility devices can benefit from information about the environment behind their mobility devices. Such information can, for example, help a user reverse their mobility device. Users typically find themselves in environments with their mobility devices where multiple objects are quite close together. In such environments it may not be possible for the user to turn their mobility device around. Instead, the user must reverse their mobility device through the environment, navigating the objects which are in close proximity and behind the mobility device. Users may also need to reverse into or through a particular portion of an environment (such as through a doorway) because the mobility device is more maneuverable when reversing as compared to going forward. This is similar in concept to needing to reverse a car to parallel-park.

The system 100 may also be able to alert a user to a potential security threat behind their mobility device. Users of mobility devices may have an increased risk of theft. It is common for mobility device, and especially wheelchair users, to hang a backpack containing person items on the back rest of their mobility device. This makes it easier for someone to remove an item from the backpack without the user's knowledge. For example, the system 100 may alert the user to a person behind their mobility device, the proximity of that person, and/or whether the person is approaching or moving away from the back of the mobility device. If the system 100 detects a person that is close to the back of the mobility device and continuing to approach the mobility device, this alerts the user that the person may be attempting to steal their belongings or intentionally make contact with the user.

Navigating a mobility device through a doorway can be difficult for a user, irrespective of whether it is done in forward or reverse. Navigating a doorway with a mobility device can be difficult for a number of reasons. For example, a doorway has solid walls which are opposite to each other to define a narrow space through which to pass. The widths of doorways are typically set for a person without a mobility device. Mobility devices are typically much wider than a standard person. Doorways may also have doors which consume a portion of the space within a doorway which would have otherwise been available.

In accordance with an embodiment of the present disclosure, the system 100 is used to help a user navigate their mobility device through a doorway. This may comprise helping the user to better align their mobility device with a doorway before the user passes their mobility device through the doorway. In an embodiment, the system 100 is first put into short range mode. The user then navigates their mobility device towards the doorway. The sensor module detects the sides of the doorway within the detection zones as they approach, and the system 100 alerts the user to the mobility device's position relative to the sides of the doorway through the haptic feedback module 170 and the light module 152. A user knows they are properly aligned to pass through a doorway without a collision with the doorway when both the left light 154 and the right light 156 of the light module 152 are illuminated the same colour, and the middle light 158 is of a colour that indicates that there is sufficient open space in the direction the user needs to travel. If both side lights are illuminated the same colour, this indicates to the user that the sensors for the left detection zone 106 and the right detection zone 108 are approximately the same distance to the left and right sides of the doorway, respectively. For example, if both left and right lights 154, 156 are red, this indicates that the sensor module (and the corresponding mobility device) is relatively centered within the doorway and likely not going to hit either side. By contrast, if the left light 154 is red but the right light 156 is yellow (or whatever colour is mapped to a greater distance threshold range), this indicates that the sensor module 102, as a proxy for the mobility device, is misaligned with the doorway: it is too close to the left side of the doorway and not sufficiently close to the right side of the doorway. The user then knows to bring the right side of the wheelchair closer to the right side of the doorway to better align and avoid a collision with the left side of the doorway. Where the lights are LEDs, a user can more easily see the colour of the lights in their peripheral vision. Having different shaped cut-outs for the lights in the top of the feedback module can also help a user differentiate between the lights, particularity when all of the lights are not illuminated at the same time. The combination of LEDS and different shaped cut-outs can help a user obtaining object proximity information by using their peripheral visions without looking directly at the lights, themselves. Being able to use peripheral vision to receive information from the system 100 can enable the user to use their direct vision to also help with navigating the doorway (or some other environment).

The vibration module 170 can also provide information to the user to help the user navigate through the doorway without a collision. A user knows they are properly aligned to pass through a doorway if the left vibration motor 172 and the right vibration motor 174 each provide the same number of vibration cycles, vibration durations, and/or vibration intensities. The same number of vibration cycles, the same vibration durations, and/or the same vibration intensities means that each of the left side of the doorway and the right side of the doorway are within the same range thresholds for the left and right detection zones 106,108. In other words, neither side of the doorway is too close or too far away from the sensor module 102 such that one side of the mobility device will hit the doorway frame. If there are unequal number vibration cycles, vibration durations, or vibration intensities between the left and rights vibration motors 172, 174, the user knows to navigate the mobility device in the direction corresponding to the side which has had a lower number of vibrations cycles, vibration duration, or vibration intensity. This is because the sensors for that detection zone have not come sufficiently close to the corresponding side of the doorway frame. In other words, the user's goal is to cause the left and right vibration motors to produce the same number of vibration cycles, vibration durations, and/or vibration intensities.

In another embodiment, the system 100 is used to navigate a mobility device closer to an object without collisions so that the user may interact with the object or something close to the object. For example, the system 100 may be used to align a mobility device adjacent to a wall without collision so the user can reach a switch/button on the wall. To make it easier to reach a switch or button (e.g. such as an elevator call button) on a wall, users typically align their mobility device so that the side of the device faces (is parallel to) the wall. It can be too far for a user to reach a switch/button when the front of the wheelchair faces the wall. It can be difficult, however, for a user to align their mobility device so the side is parallel to the wall. A user might have difficulty assessing how far away a switch/button is while trying to move their mobility device to be parallel with a wall. This difficulty could be due, in party, to lower peripheral vision. In some cases, the mobility device is too far away. In other cases, the mobility device collides with the wall. In an embodiment, the system 100 is configured to provide an indication to the user via a feedback module 150 when the mobility device is parallel, and sufficiently close to, a wall for the user to reach the switch/button on the wall. In an embodiment, a side light is illuminated a particular colour on the feedback module.

In accordance with the sensor module 100 shown in FIG. 1, the sensor module 100 is mounted to a part of the mobility device (such as the lower backrest of a mobility device) using a flexible cloth strap and buckle. The cloth strap passes through a strap cavity 314 defined by the back of the sensor module housing 302.

Figure 4:
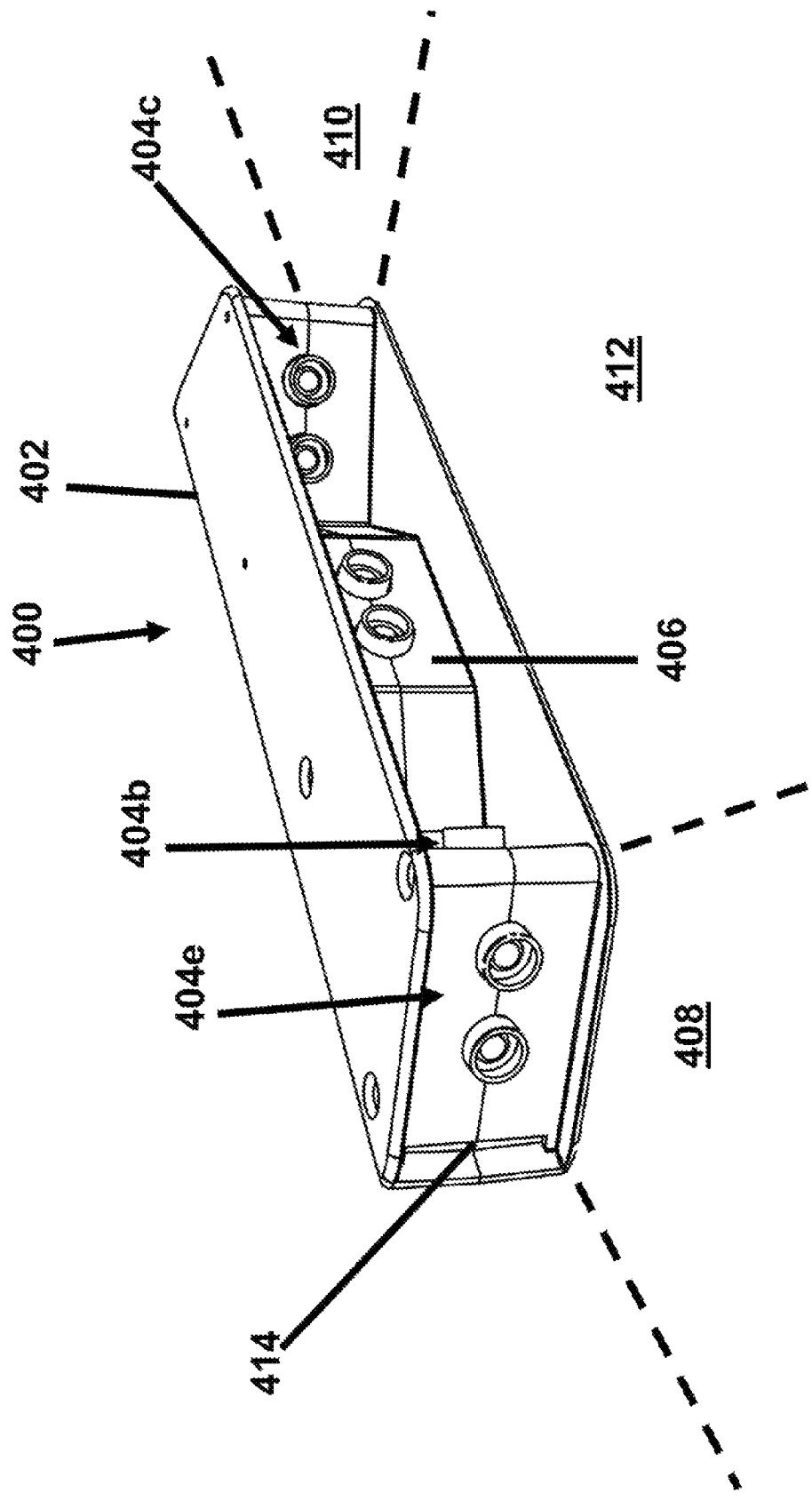
FIG. 4 shows a perspective view of another embodiment of a sensor module in accordance with this disclosure.

FIG. 4 shows a perspective view of an embodiment of a sensor module 400 in accordance with the present disclosure. The sensor module 400 is similar to the sensor module 100 shown in FIG. 1. The sensor module 400 comprises a strap cavity 414 defined by the sensor module housing 402.

FIGS. 5A-D shows various views of another embodiment of a sensor module 500 in accordance with the present disclosure. The sensor module 500 is similar to the sensor module 100 shown in FIG. 1, the difference being that the sensor module 500 is formed from predominately plastic components. The plastic components may be injection molded.

Figure 6:
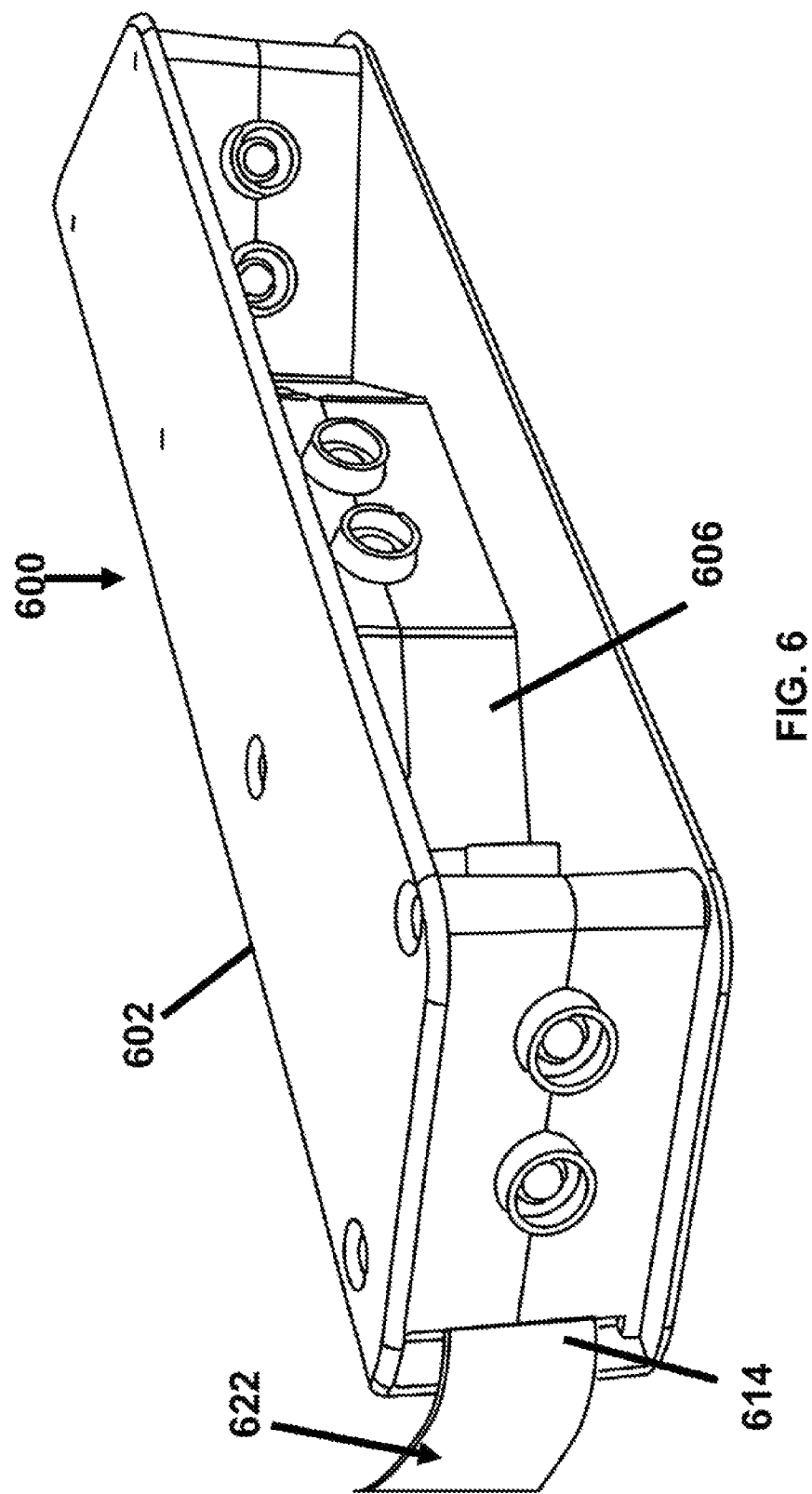
FIG. 6 shows a perspective view of a sensor module in accordance with an embodiment of the present disclosure.

FIG. 6 shows a perspective view of a sensor module 600 in accordance with an embodiment of the present disclosure. The sensor module 600 similar to the sensor module 100 shown in FIG. 1. The sensor module 600 comprises a strap 622 which passes through a strap cavity 614.

Figure 7:
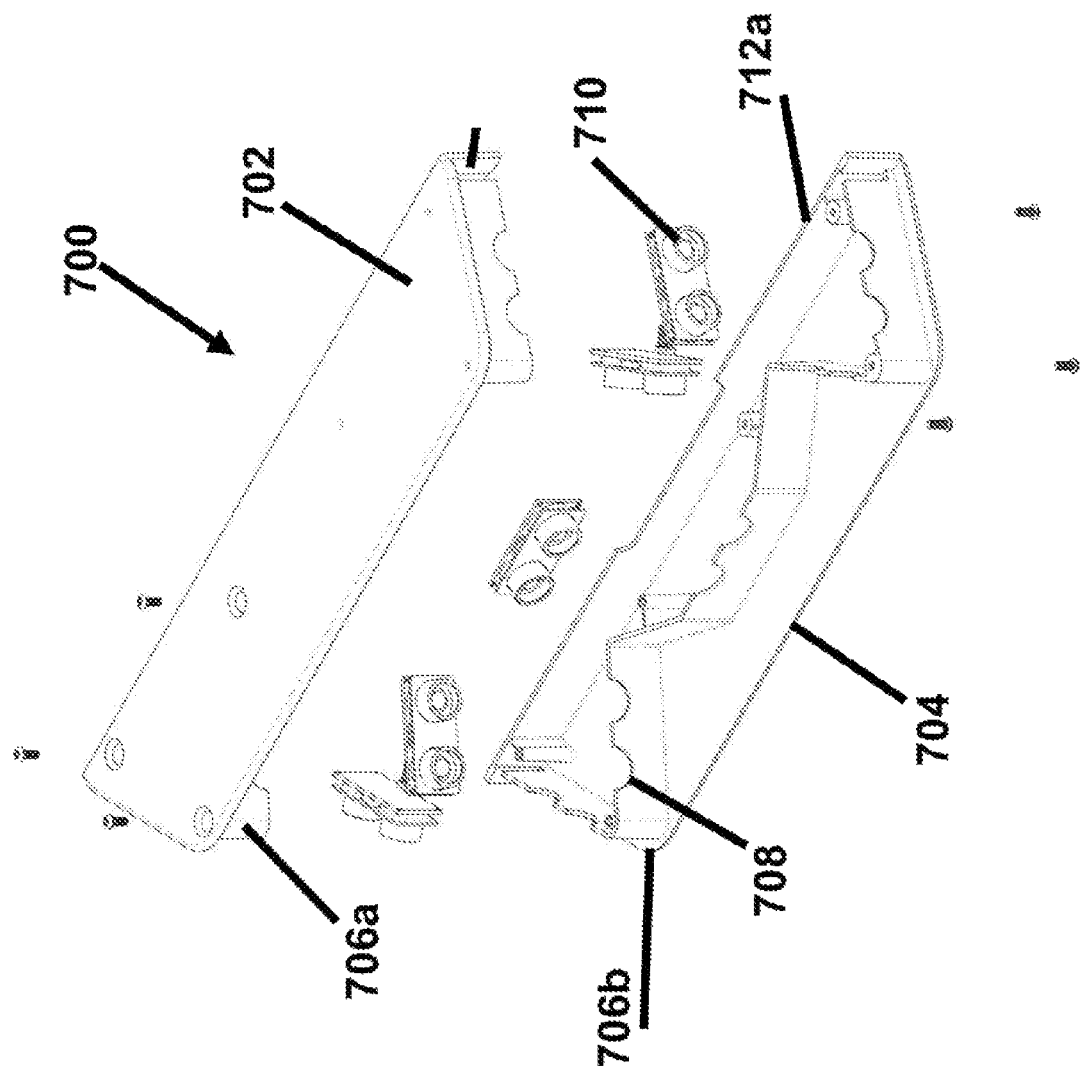
FIG. 7 shows an exploded perspective view of a sensor module in accordance with the present disclosure.

FIG. 7 shows an exploded perspective view of a sensor module 700 in accordance with an embodiment of the present disclosure. The sensor module 700 is similar to the sensor module 500 show in FIGS. 5A-D comprising predominantly plastic structural components. The sensor module 700 comprises a housing made of two-halves: a top half housing 702 and a bottom half housing 704. Each of the housing halves 702, 704 comprises a portion of the sensor support structure 706a,b integrally formed therewith: a top half 706a sensor support structure and bottom half 706b sensor support structure. The sensor support structure 706 comprises a pattern of fins 708 defining half-moon cut-outs that hold the various internal sensors 710 in place. The back plate 712a,b of the sensor module 700 is also in two halves, each half integrally formed with the corresponding housing portion.

Figure 8:
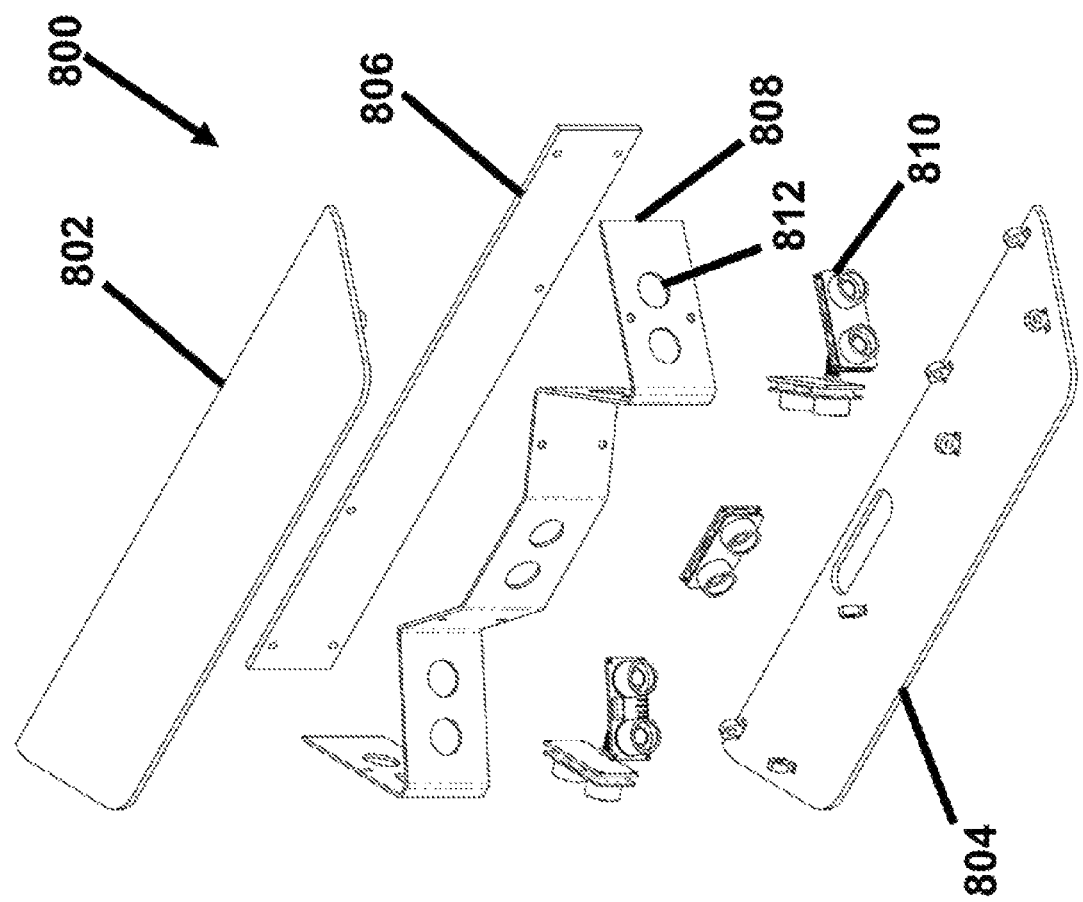
FIG. 8 shows an exploded perspective view of a sensor module in accordance with another embodiment of the present disclosure.
Figure 9A:
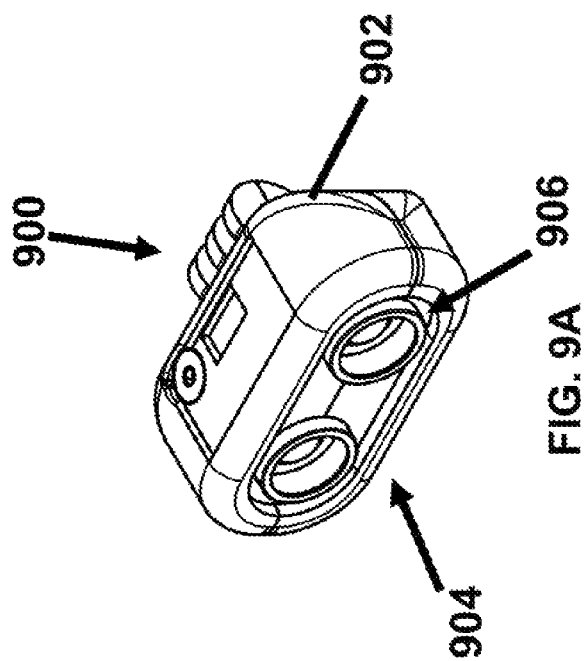
Figure 9C:
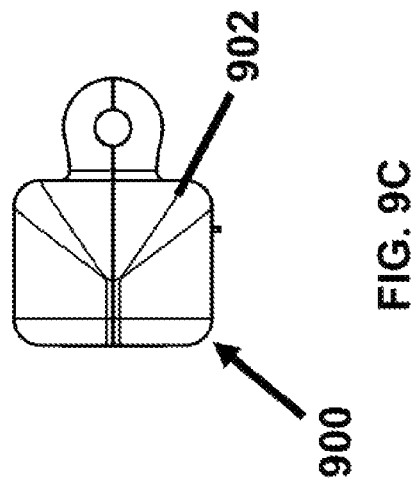
Figure 9D:
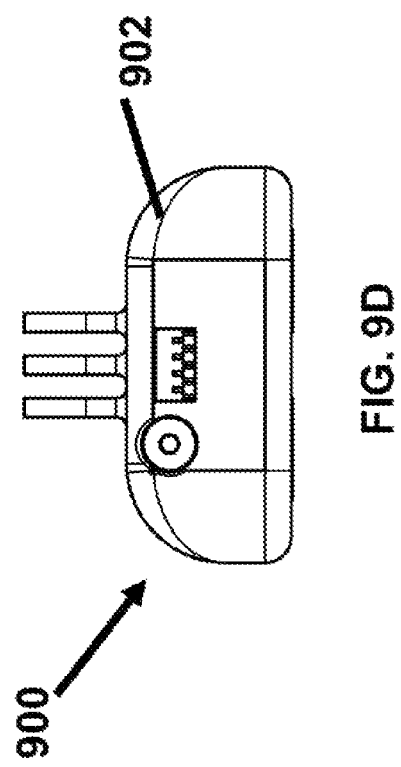
Figure 9B:
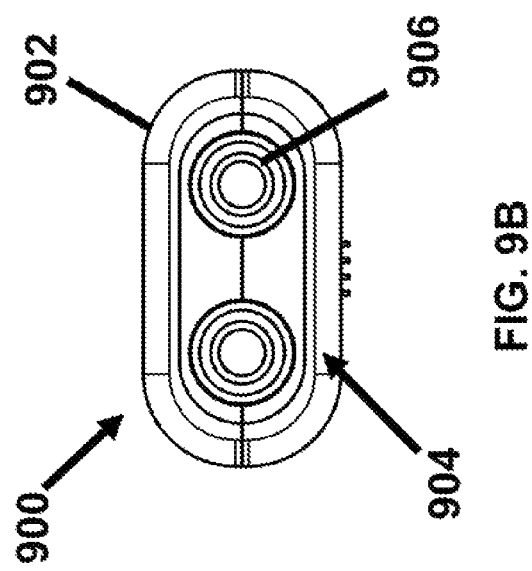

FIG. 8 shows an exploded perspective view of a sensor module 800 in accordance with an embodiment of the present disclosure. The sensor module 800 is similar to the sensor module 300 shown in FIGS. 3A-D. The sensor module 800 comprises predominantly sheet-metal or sheet-based structural components. The sensor module 800 comprises a top plate 802, a bottom plate 804, and a back plate 806. The sensor module 800 also comprises a sensor support structure 808 which may be a sheet of metal folded at different points along its length. The support structure 808 is placed between the top plat 802 and the bottom plate 804. The sensors 810 are then inserted into retaining holes 812 defined by the support structure 808. The components may be held together using fasteners (such as screws and bolts) and/or an adhesive.

FIGS. 9A-E show various views of another embodiment of a sensor module 900 in accordance with the present disclosure. The sensor module 900 contains only one sensor thereby making it smaller. The sensor may be a ultrasonic sensor comprising a separate transmitter and receiver. The sensor module 900 comprises a housing 902. The housing 902 defines one opening 904 for a single sensor 906. Rather than a single large sensor module, multiple smaller sensor modules 900 may be used together to detect surfaces with a particular area. For example, multiple smaller sensor modules 900 may be used to accommodate certain physical features on a mobility device which inhibit the use of a larger sensor module. A physical feature may prevent the larger sensor module from being properly positioned on the mobility device. A physical feature may also block a sensor from viewing a particular area. Multiple smaller sensor modules 900 may also be used to detect objects around a mobility device. The smaller sensors modules 900 can also be configured and coordinated to divide an area around the mobility device into one or more detection zones. The boundaries of these detection zones may not necessarily being contiguous with one another. Multiple smaller sensor modules 900 may also be combined together and/or with a larger senor or multiple sensors (such as the sensor module 102) in one system to help increase the area monitored by the sensor modules, collectively, and/or to increase the system reliability by overlapping the areas monitored by each sensor. For example, a smaller sensor module 900 may be placed at a user's head level to monitor for high objects (such as tables) which may be difficult to detect with just a sensor module, alone. The sensor modules 900 may connect into a central hub containing a processor and/or the computing module. The central hub may reside in a large sensor module 102 or outside. The readings from each of the multiple sensor modules 900 are analyzed by the processor in accordance with certain instructions to obtain aggregate data representing the proximity of an object to the sensor module. The sensor module location may be a proxy for a location on the mobility device. That proximity data is then communicated to a user using a feedback module.

FIG. 9E shows an exploded view of the sensor module 900. The housing has a top half 902a and a bottom half 902b. The sensor module 900 also has a back plate 904. The housing 902a,b and back plate 904 retain the sensor 906 in a proper orientation.

The sensors used with a sensor module may be any one or more types of sensors that can detect the proximity of a surface of an object to the detector of the sensor. The type(s) of sensors used in a sensor module may depend on the application for which the sensor module is being used. Different types of sensors may be incorporated into a single sensor module.

In an embodiment, a sensor may be ultrasonic sensors. Ultrasonic sensors may be used when the application is for detecting objects or surfaces within the vicinity of a mobility device. In a mobility device application, the system may be required to determine the distance of a surface to a mobility device when the mobility device is within a range of less than 3 meters from the object or surface. The system may need to be able to detect the distance of a surface of an object within a margin of error of 0.5 to 5 centimeters. The system may also be required to function outdoors where lighting, sound, and electro-magnetic interference may reduce the reliability of readings from certain types of sensors. Since a mobility device typically moves relative to objects, and the system may be used to help a user navigate objects within their surroundings/environment, the system may be required to quickly detect changes in the distance between the mobility device and an object/surface. The system may be required to detect changes in the distance in real-time. The sensors may also need to be relatively inexpensive by capable of being configured to provide a reliable outcome. Ultrasonic sensors may be better suited than other types of sensors to achieving the above-noted requirements.

In an embodiment, the ultrasonic sensor of the sensor module comprises a transmission transducer (also referred to as transmitter) and a separate reception transducer (also referred to as receiver). Having separate transmission and reception transducers may help improve the minimum distance the sensor is able to detect, and the rate at which changes in the distance of an object or surface to the sensor is detected. While it may be possible to use a single transducer for both transmitting an ultrasonic signal and detecting the reflection of that signal off of a surface or an object, a single transducer may result in a lower rate of distance detection and a higher minimum distance that can be detected. This is because in a single transducer sensor, the transducer alternates between transmitting an ultrasonic signal (transmitting mode) and receiving an ultrasonic signal (receiving mode). When transitioning between the transmitting and receiving modes, the transducer must be allowed to settle for a period of time before it is capable of receiving the ultrasonic signal reflected from the surface. The closer an object is to the sensor, the less time the sensor has to settle before needing to transition the sensor to receiving mode to detect the reflection of the transmitted signal. The smallest distance that is possible to detect with a single transducer may make the single transducer sensor undesirable if the application requires detecting obstacles at a close range such as in certain mobility applications.

A sensor may in the alternative be, or comprise, one or more of an infrared sensor, Lidar, radar, a electromagnetic sensor, an accelerometer, or gyroscopic sensors. Using different or multiple types of sensor in sensor module(s) forming part of the system may help improve accuracy, reliability, and/or the functionality of the system for certain applications. Depending on their construction, a proximity sensor may be better suited to detecting surfaces of objects in specific distance range or materials.

In an embodiment in accordance with FIGS. 3A-D, five ultrasonic sensors 304a, 304b, 304c, 304d, 304e (each sensor comprising a transmitter transducer 316 and a separate receiver transducer 318) are used to create three detection zones. The detection zones collectively covering a 180-degree horizontal plane around the sensor module 300. The detection zones are a left detection zone 308, a middle detection zone 310, and a right detection zone 312. The detection zones may overlap. The sensor module 300 may be positioned on a mobility device as shown in FIG. 1 so that the detection zones cover the area at the rear of the mobility device. The ultrasonic sensor is suitable in this application as the types of material that are acoustically reflective and detectable by ultrasonic sensor are typically hard and desirable to be avoided by a mobility device. Hard surfaces typically cause more damage when contacted by a mobility device. By contrast, the types of materials that are not acoustically reflective (and therefore invisible to the ultrasonic sensor) are soft and cloth-like materials, which users are less concerned about avoiding since they typically cause less damage when contacted by a mobility device. Put another way, acoustically reflective, hard, materials are highly visible to ultrasonic sensors, and are also potentially damaging in the case of a collision.

The sensors 304a-e may be positioned in the sensor module 300 according to the angle defined by their specific field of view. If each sensor has is a narrower field of view, the angle of each sensor face relative to each other may be greater to ensure a particular total area is covered, even if there are blind spots within that total area. This may also reduce the overlap of sensor cones. On each end of the sensor module 300, a sensor 304e, 304d may point sideways such that the forward-most limit of its field of view is parallel to the plane defined by the back of a seat of a mobility device. All of the other sensors would be angled accordingly to give 180 degrees of vision area. One sensor 304b may be located in the middle of the sensor module 300, to view the area directly behind the mobility device. The two remaining sensors 304a, 304c may be located next to the outward-facing sensors 304e, 304d, but may be pointed inward by an angle selected to give a reasonable balance of redundancy directly behind the mobility device, and consistent angular coverage. The two outer pairs of sensors 304e, 304d may be spaced approximately 20 cm apart and the housing 302 may be approximately 30 cm wide to occupy about 80% the width of a mobility device.

The computing module may be contained within the housing of the sensor module, or within a separate housing to be attached elsewhere to a mobility device. The computing module may include extra ports to allow for additional sensor modules to be connected. Where the computing module is external to a sensor module, all sensor modules may be connected via such ports. The computing module may also contain ports to be used by one or more feedback modules. The computing module may also consist of a wireless transmitter/receiver to use a wireless communication protocol (such as Bluetooth) to send/receive wireless signals and communicate with all of the electronic devices that are part of the system, or other electronic devices.

In an embodiment, the computing module receives data from one or more sensor modules, analyzes the data, and controls the feedback module in accordance with the analyzed data. The output to the feedback module may be based on adjustable feedback module parameters.

In an embodiment, the computing module receives unprocessed (raw) sensor data from the sensors within the one or more sensor modules. The raw data is then normalized using algorithms that include noise filtering. The algorithms may check for local temporal coherence (the correlation or relationship between data collected at different moments in time by the same sensor) in order to eliminate incorrect data. The algorithms may comprise a low-pass filter, which can help eliminate sensor reading spikes and other anomalies. The algorithms may use some adjustable variables in order to recognize unwanted or incorrect data. Machine learning algorithms may also be used to learn sensor models and predict system accuracy.

Data from sensors that are observing or allocated to monitor the same detection zone are then combined by the computing module in a manner so as to assess the proximity of the closest obstacle or surface within that detection zone. Data from sensors positioned to predominantly monitor other detection zones, but which have overlapping coverage with the detection zone, can also be used. Global temporal and spatial coherence (within each detection zone, and/or across multiple sensors and/or detection zones) can then be used to achieve a single object surface proximity value for each detection zone. In the case that different types of sensors are used, a weighted combination of sensor values may be used. Final object surface proximity values for each detection zone may then be communicated to the feedback module based on adjustable parameters (e.g., intensity and colour mappings).

The computing module may comprise a memory. The memory may store adjustable setting parameters. The parameters may relate to the assignment of sensors in the sensor module to detection zones, and affect how readings from those sensors are analyzed/combined, and the actions to take in response to the date analysis. The computing module may also store parameters relating to the feedback module(s), including which modules are enabled and disabled, distance ranges, mappings of these ranges to feedback parameters (e.g., light intensity, colour corresponding to distance threshold ranges, audio type, audio volume, audio frequency, vibration duration, vibration intensity, intervention type).

The computing module may also be configured or programmed to comprise multiple modes that can be toggled between, each mode with its own set of adjustable distance threshold ranges that trigger warning indications and danger indications. Each mode can thus define the proximity values corresponding to the type of feedback provided to the user via the feedback module(s).

In an embodiment, a first mode may be configured such if the mobility device is a distance of between 41 cm and 60 cm from an obstacle or surface, a warning indication is provided, while at distances equal to or lesser than 40 cm, a danger indication is provided. A second mode may be configured to provide warning indications when the mobility device is a distance of between 25 cm and 45 cm from an obstacle or surface, and danger indications at distances lesser than or equal to 24 cm.

The computing module may be programmed to comprise persistence variables which determine how long an obstacle is reported to a user via the feedback module to be in a detection zone after the object has left the zone. In addition, a block or feature of the feedback module corresponding to a particular detection zone might be illuminated based on the detection of a surface or object in an adjacent detection zone. This would help account for the motion model and/or dimensions of the mobility device. For example, even if an object is detected as being present in a middle zone and the left and right zones are determined to be free of any obstacles, the feedback module may show all three zones to comprise obstacles since a mobility device might not be able to safely navigate to the left or right zones at full speed without hitting the obstacle that is in the middle zone.

Parameters and/or settings may be configured or selected directly on the computing module, and/or by using a physical switch, a wireless switch (e.g., using a smart phone application), and/or a voice-activated mechanism that relays the information to the computing module.

Data collected and processed by the computer module may be saved to a computer-writable medium and/or may be transmitted wirelessly and/or uploaded to a server connected to the internet (cloud). Such data can be used for logging and/or monitoring purposes. For example, such data can be used to present information regarding near-collisions, average distance to obstacles, proximity to obstacles, location of obstacles, the mobility device user's driving behaviour, etc. In one embodiment, proximity and locations of obstacles are display in a web or smart phone application.

A feedback module may provide a variety of types of feedback to the user, including, visual, audio, and/or haptic feedback. A feedback module may be configured to provide different information to a user for each type of feedback. For example, the feedback module may provide warning indication(s) to signify that an object has entered one or more of the detection zones, passed through a distance threshold for a particular detection zone, and/or entered the immediate vicinity of the mobility device. The feedback module may also provide a danger indication to signify that an object or surface has entered the immediate vicinity of the mobility device. Individual feedback modules may be activated and/or de-activated through one or more of a physical switch, a wireless switch (e.g., using a smart phone application), and/or a voice-activated mechanism. The feedback module may comprise the computing module or be connected to a separate computing module.

A visual feedback module may be a flexible, movable, component (such as a strap) having visual indicators. A movable feedback module can help ensure that notwithstanding the configuration of the mobility device, the visual feedback module may be positioned on the mobility device or user so that the user can view. The visual indicators may grouped in blocks that map or correspond to detection zones of the sensor module(s). Each block may consist of one or more lights that are activated when an obstacle is detected within an adjustable distance threshold ranges (also referred to as a "distance ranges"), of the detection zone. These distance ranges may be mapped such that specific colours or light intensities occur on the visual feedback module. The mappings may be adjustable. For example, an obstacle that is detected within 20 cm of a sensor module for a particular zone might result in the corresponding block appearing red as a danger indication, while an obstacle that is detected between 21 and 41 cm of the sensors module for a particular zone might result in the corresponding block appearing yellow as a warning indication. This component might consist of a structural element to provide shade over the lights, keeping them visible despite bright light conditions, such as direct sunlight.

The haptic feedback module may be a movable component that produces vibrations when an obstacle is detected within any a particular distance range. The intensity, frequency, and/or duration of the vibration may be configured so as to be proportional to the proximity of the obstacle. For example, a warning indication might be communicated to the user by having the haptic feedback module provide a weak and short vibration. A danger indication might be communicated by having the haptic feedback module provide a strong and long vibration. An indication in the haptic feedback module is provided if the proximity value is found to lie within a different distance range than before, or if the proximity value lies within the same distance range as before but differs from the previous proximity value(s) by a specified or adjustable amount. This may help reduce user annoyance in the case, for example, that their mobility device is parked beside a stationary obstacle in the immediate vicinity, and their mobility device does not move any closer to obstacle.

The audio feedback module may be a movable component that plays a pre-recorded sound when an obstacle is detected within any of the adjustable distance thresholds. The volume and/or frequency of the sound can be proportional to the proximity of the obstacle, and may be adjustable. For example, a warning indication might be communicated in a soft voice, or as a soft beep or low-frequency tone, while a danger indication might be communicated in a loud voice, or a loud beep or high-frequency tone. A sound is provided if the proximity value is found to lie within a different distance range than before, or if the proximity value lies within the same distance range as before but differs from the previous proximity value(s) by a specified or adjustable amount. This may help prevent user annoyance in the case, for example, that their mobility device is parked beside a stationary obstacle in the immediate vicinity, and their mobility device does not move any closer to obstacle.

The visual, audio, and/or haptic feedback modules may be integrated into a single movable, flexible component, or be provided as separate devices or components of the system. In addition, the visual, haptic, and/or audio feedback modules may be embodied in a smart device application on a mobile phone, where the visual feedback is displayed within an application, the haptic feedback is provided through the smart device's vibrating motor, and the audio feedback is provided through the smart device's speaker.

The feedback module(s) may be mounted directly to the mobility device, on the user's person, on or within the sensor module(s), or any combination of the above. The feedback module(s) may be fastened to the mobility device, the user's person, or within the sensor module(s) in a number of ways including, fabric fasteners/straps, adhesives, rigid couplers, or some combination thereof. The feedback module may include a system of spacers or supports that allow the precise position and attitude of each module to be adjusted during and after mounting.

FIGS. 10A-E show various views a feedback module 1000 in accordance with an embodiment of the present disclosure. The feedback modules 1000 is a visual feedback module similar the feedback module 150 shown in FIG. 2. The feedback module 1000 receives data from the sensor module, analyzes the data, and provides aggregated information to a user. The aggregated information may reflect the proximity and/or locations of objects and/or surfaces of objects within the vicinity of the mobility device being monitored by the sensor module(s).

Referring to FIG. 10A, the feedback module 1000 comprises a body 1018. The top surface 1020 of the body 1018 provides a visual user interface for displaying aggregated information to the user. The top surface 1020 may comprise a cover defining cut-outs or windows so that lights within the body 1018 or visible to a user.

As shown in FIG. 10E, the top surface may be a transparent sheet of plastic or glass. An overlay 1026 defining cut-outs or windows may be placed on the transparent sheet so that only certain lights below the transparent sheet are visible to a user. The overlay 1026 may be a flexible piece of plastic with an adhesive backing such as a sticker. The sticker may have perforated areas to allow a user to remove portions of the sticker before installation to provide the cutouts or windows. This could allow a user to customize what lights of the feedback module 1000 they wish to see. This customization could be performed by the user at the time of installation on the mobility device. The feedback module 1000 also comprises a vibration control 1016 which allows a user to set the intensity of vibrations in a haptic module. The vibration control 1016 comprises a knob 1028 attached to a potentiometer 1030. This allows the user to fine-tune the vibration intensity. The knob may have a stop thereon which limits the amount by which the potentiometer may be rotated. A stop which limits the rotation of the potentiometer to less than the maximum rotation possible may be desirable so a user cannot inadvertently set the vibrations to the maximum possible intensity. This might be particularly useful for users who may, for example, have day-to-day variations in their sensitivity or tolerance of vibration stimuli. The feedback module 1000 comprises a port 1024. The port 1024 is so the feedback module 1000 can be electrically connected to the sensor module and/or a haptic module or a power supply. The feedback module 1000 also comprises a bracket 1022 so it can be fastened to a mobility device. The bracket can accommodate a bolt or a similar rod-type structure to allow the feedback module 1000 to pivot about the axis of the bracket 1022. A user may wish to change the angle of the feedback module 1000 to, for example, have a better view of the top of the feedback module 1000 or limit the interference from overhead light such as from the sun.

Figure 11A:
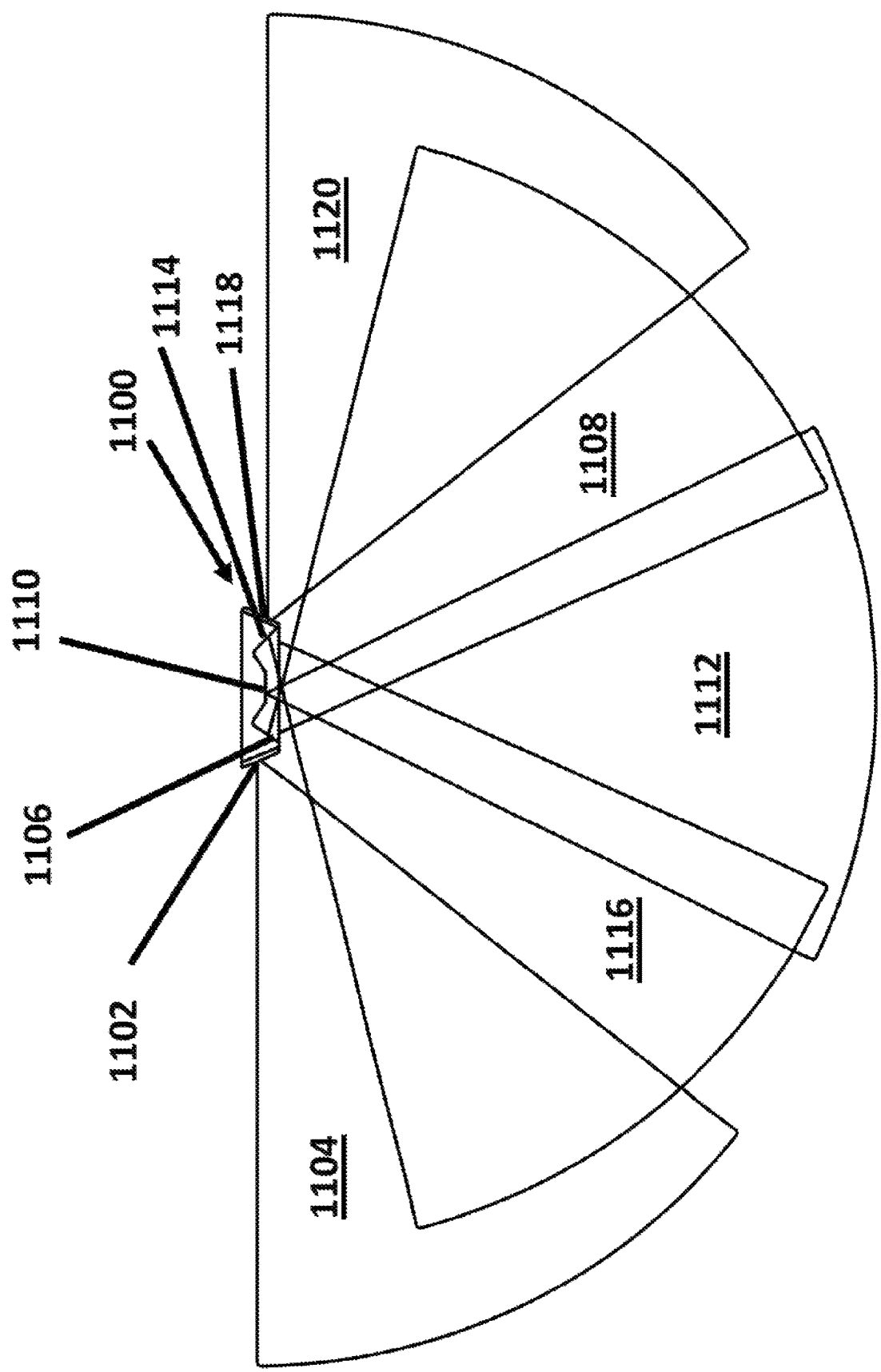
FIGS. 11A-B show top views of an embodiment of a sensor module and corresponding sensor cones in accordance with the present disclosure.
Figure 11B:
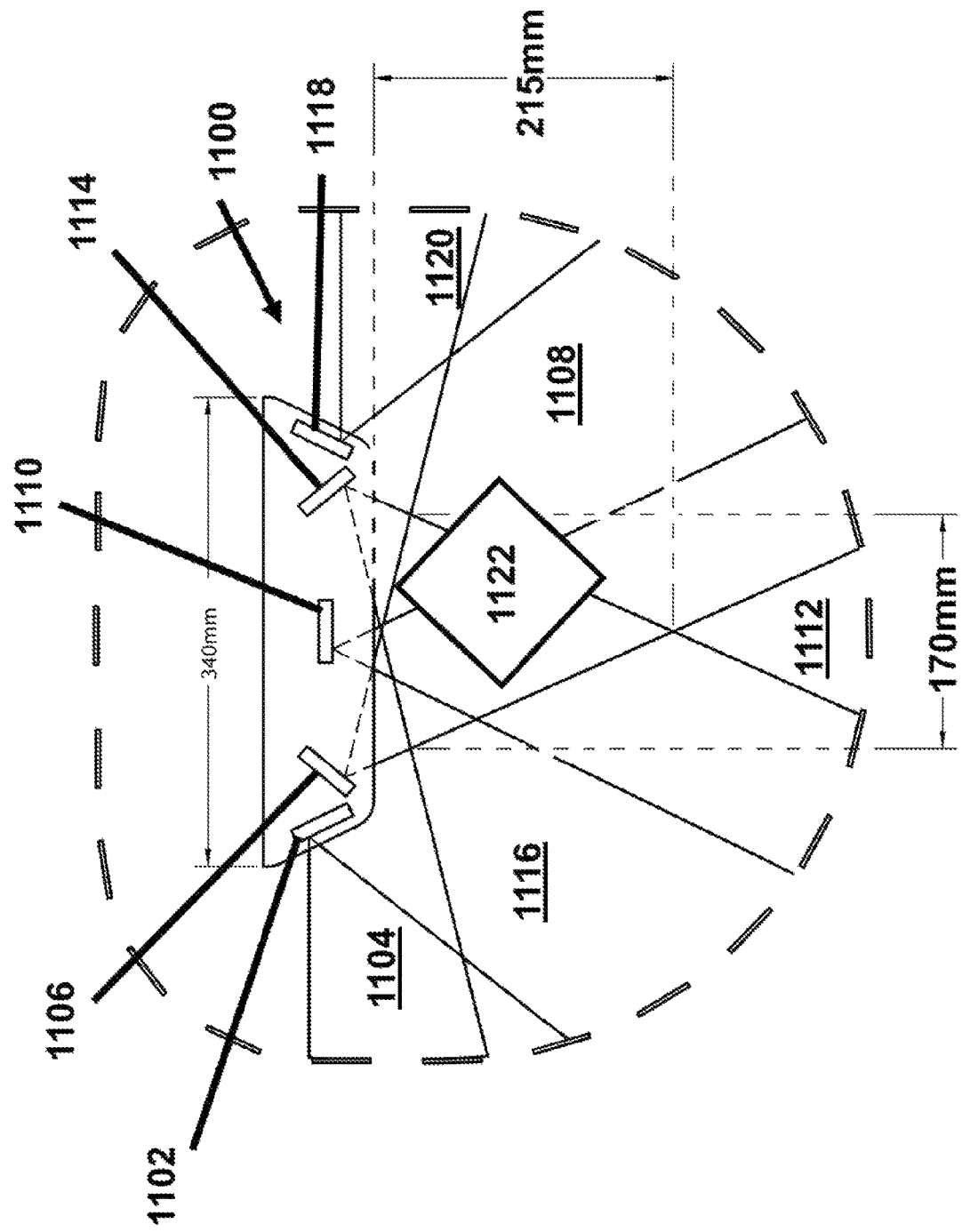

FIGS. 11A-B shows a top view of another embodiment of a sensor module 1100 in accordance with the present disclosure. FIG. 11B is a close-up view of the region around the sensor module 1100 of FIG. 11A. The sensor module 1100 is similar to the sensor module 300 shown in FIGS. 3A-D. The sensor module 1100 comprises proximity sensors 1102, 1106, 1110, 1114, 1118. The proximity sensors may be ultrasonic sensors. Each of the proximity sensors 1102, 1106, 1110, 1114, 1118 is configured to detect the proximity of a surface to the sensor within a corresponding area of coverage 1104, 1108, 1112, 1116, and 1120, respectively. If the proximity sensor is an ultrasonic sensor, it may be configured to detect the surface which is closest to the face of the sensor. FIG. 11 shows the areas of coverage 1104, 1116, 1112, 1108, and 1120 as two-dimensional planes for ease of visualization, but it will be appreciated that the areas within which the sensors can detect the proximity of a surface are actually three-dimensional volumes having a conic shape. The surface which the sensors detect may belong to an object such as a box 1122 as shown in FIG. 11B.

Referring to FIG. 11B, centre sensors 1106, 1110, and 1114 are configured so that sensors 1106 and 1114 are each angled inwards by 45 degrees relative to middle sensor 1110. This results in a number of positive attributes. First, all three sensor cones 1116, 1112, and 1108 converge and overlap in the area close to the front of the sensor module 1100. This results in redundant sensor coverage for the area immediately adjacent the front of the sensor module 1100. It is important to have an accurate reading in this area. An inaccurate reading could result in a collision. Second, all three sensor cones are at significantly different angles to one-another in this area of overlap. Having different sensor cone angles covering the same area allows a large number of surface angles to be detected by the three sensors, collectively, within that area. As previously noted, a single ultrasonic sensor (and an inexpensive ultrasonic sensor in particular) has increasing difficulty detecting a surface the more that surface tends towards an angle perpendicular to the face of the sensor. Third, the three sensor cones extend well past the area of convergence (as shown in FIG. 11A) to cover the area at a distance from the sensor module 1100. Fourth, sensor cones 1116 and 1108 also extend into (so as to overlap with) side sensor cones 1104 and 1120, respectively, providing additional redundancy (at two different angles) for those areas. Fifth, the total area covered by the combination of all five sensors 1102, 1106, 1110, 1114, 1118 at their particular angles results in an aggregate view angle of 180 degrees with limited blind spots. Using multiple inexpensive ultrasonic sensors in the foregoing configuration may provide the information required by a user, but at a cost that is significantly less than what it would be for fewer higher-quality sensors (such as Lidar sensors).

By way of example, no surface of box 1122 is detected by sensor 1110 because the angles of the two closest surfaces of the box 1122 are 45 degrees to the face of sensor 1110. The two surfaces, however, are each detected by one of sensors 1106 and 1114 since the each of the surfaces is parallel to one of those two sensors. In an embodiment, a processor in communication with the sensors 1106, 1110, 1114 receives the readings from the sensors of the distances to the box surfaces detected. According to the algorithm, the sensor cones of sensors 1106, 1110, 1114 collectively cover a middle detection zone. The middle detection zone would include all of the area covered by cones 1116, 1112, and 1108. The middle detection zone has a corresponding indicator for the user feedback module(s). The processor aggregates the distance readings of the sensors 1106, 1110, 1114 covering the middle detection zone. Aggregation may comprise selecting the reading amongst the three sensors with the smallest distance, which is the reading from sensor 1114 since it is closest to a surface of the box 1122. This smallest distance reading is used to represent the distance of the surface of the object in the detection zone relative to a reference location on the sensor module. The sensor module 1100 has multiple groups of one or more sensors. Sensor 1104 belongs to a first group. Sensors 1116, 1112, and 1108 belong to a second group. Sensor 1120 belongs to a third group. The processor is configured to correlate the first group sensor readings with the left detection zone, the second group sensor readings with the middle detection zone, and the third group sensor readings with the right detection zone. Note the overlap in are of coverage between the detection zones. The processor controls a user feedback module according to the unitary value selected for each detection zone at a particular time. The user feedback module may comprise three lights, each of the lights corresponding to one of the left, right, and middle detection zones. The middle light corresponds to the middle detection zone. The processor may illuminate and set the colour of a particular light according to the unitary value for the corresponding detection zone. The colour/intensity of the light may be in accordance with a distance threshold range. The user feedback module may use any visual display to notify a user of the presence and/or proximity of a surface within a detection zone. For example, the user feedback module may comprise a screen. The screen may show representations of the detection zones. The screen may also show representations of the mobility device and surfaces detected within the detection zones. The algorithm may smooth the selected reading for a detection zone so that small changes in distance, particularly going from a closer distance range (e.g. danger) to a longer distance range (e.g. warning) is ignored if that longer distance range has not been observed for a threshold period of time. Changes in the other direction (longer distance range to shorter distance range) may always be reported to the user to help ensure a user has notification if a surface is indeed getting closer.

The system can provide users of mobility devices with information regarding the presence and locations of obstacles in their vicinity. Collisions with these obstacles may be difficult to avoid, however, due to a user's difficulty controlling the mobility device, or the user's inability to see or be otherwise aware of obstacles. For this reason, the system/device may also comprise an intervention module which can intervene in the event of an impending collision by a mobility device by controlling the speed, acceleration, or other properties of the mobility device.

The intervention module might interface with the input device that controls the mobility device, the controller, and any mobility device actuators through hardware that is custom, provided by mobility device or controller manufacturers, or by a third party, or any combination of the above. For example, the intervention module may receive data from one or more input devices (such as joysticks, head arrays, Bluetooth controllers, etc.), and optionally an accelerometer. This information may be sent to the controller where input regions are created. Input regions may correspond to subsets of all possible speeds, accelerations, and/or directions that can be selected by the input device, and may be mapped to sensor module detection zones. The controller may then use the data received from each input region and the proximity of obstacles in corresponding sensor module detection zone(s) to modify the behaviour of the mobility device through the intervention module. For example, a time-to-collision approach might be used in order to reduce the speed and/or acceleration of the mobility device, and/or change its direction, as appropriate. In the case where multiple input devices are used, each input device can be issued a priority ranking such that an input device of higher priority ranking overrides one with lower ranking. Since all feedback modules can be activated and de-activated, an example application of the system/device might be the activation of the intervention module for a specific purpose such as backing up into a vehicle. In this case, the intervention module can help guide or assist the mobility device into the vehicle.

We claim:

1. A system, comprising:
    a sensor module comprising two sensors and configured to be mounted on a mobile device, each sensor configured to detect a proximity of a surface within a selected area about the mobile device, the sensor module retaining the sensors such that a face of each of the sensors is at an angle to a face of the other sensor, the sensor module retaining the sensors such that the angle is an inward-facing angle;
    a user feedback module comprising a plurality of lights;
    a computing module in communication with the sensors and the user feedback module, the computing module configured to:
    receive readings of the proximities of surfaces from the sensors;
    attribute the readings to one or more detection zones; and control the illumination of the lights corresponding to detection zone(s) in accordance with the sensor readings attributed to the detection zone(s).

2. The system of claim 1, wherein the sensor module further comprises more than two sensors.

3. The system of claim 1, wherein the computing module is configured to aggregate the readings from a group of the sensors having overlapping selected areas collectively defining a detection zone.

4. The system of claim 3, wherein the computing module is configured to determine a unitary value corresponding to the aggregate of the readings from the sensor(s) for the detection zone.

5. The system of claim 4, wherein the two sensors of the sensor module are part of a set of at least three sensors, the system further comprising three groups of the sensors, each of the groups containing one or more sensors of the set of at least three sensors, a first of the three groups defining a left detection zone, a second of the three groups defining a right detection zone, and a third of the three groups defining a centre detection zone, the left, right, and centre detection zones covering an area about the sensor module, and wherein the user feedback module comprises a left light, a right light, and a centre light corresponding to the left, right, and centre detection zones, respectively.

6. The system of claim 4, wherein the two sensors of the sensor module are part of a set of at least three sensors, the system further comprising three groups of the sensors, each of the groups containing one or more sensors of the set of at least three sensors, a first of the three groups defining a left detection zone, a second of the three groups defining a right detection zone, and a third of the three groups defining a centre detection zone, the left, right, and centre detection zones covering an area about the sensor module, and wherein the user feedback module comprises a left vibration motor, a right vibration motor, and a centre vibration motor corresponding to the left, right, and centre detection zones, respectively.

7. The system of claim 4, further comprising a vibration device, wherein the computing module is configured to activate the vibration device in response to the unitary value transitioning between different threshold distance ranges.

8. The system of claim 4, wherein the computing module is configured to illuminate a light of the feedback module different colours based on the unitary value being within certain threshold distance ranges.

9. The system of claim 1, wherein the sensors are ultrasonic sensors.

10. A system, comprising:
a sensor module comprising two sensors each configured to detect the proximity of an object to the sensors, the sensor module retaining the sensors such that a face of each of the sensors is at an angle to a face of the other sensor, the sensor module retaining the sensors such that the angle is an inward-facing angle;
a computing module configured to control the sensor module and analyze the data received from the sensor module; and
a user feedback module for providing information to a user of a mobility device regarding the proximity of the mobility device to an object based on the sensor module data analyzed by the computing module.

11. The system of claim 10, wherein the sensors are ultrasonic sensors.

12. The system of claim 10, wherein the sensor module further comprises more than two sensors.

13. The system of claim 10, wherein the computing module is configured to aggregate the readings from a group of the sensors having overlapping selected areas collectively defining a detection zone.

14. The system of claim 10, wherein the two sensors of the sensor module are part of a set of at least three sensors, the system further comprising three groups of the sensors, each of the groups containing one or more sensors of the set of at least three sensors, a first of the three groups defining a left detection zone, a second of the three groups defining a right detection zone, and a third of the three groups defining a centre detection zone, the left, right, and centre detection zones covering an area about the sensor module, and wherein the user feedback module comprises a left light, a right light, and a centre light corresponding to the left, right, and centre detection zones, respectively.

15. The system of claim 10, wherein the two sensors of the sensor module are part of a set of at least three sensors, the system further comprising three groups of the sensors, each of the groups containing one or more sensors of the set of at least three sensors, a first of the three groups defining a left detection zone, a second of the three groups defining a right detection zone, and a third of the three groups defining a centre detection zone, the left, right, and centre detection zones covering an area about the sensor module, and wherein the user feedback module comprises a left vibration motor, a right vibration motor, and a centre vibration motor corresponding to the left, right, and centre detection zones, respectively.

16. A system, comprising:
a sensor module comprising two ultrasonic sensors, each sensor comprising an ultrasonic transmit transducer and an ultrasonic receive transducer, each sensor for detecting the proximity of an object to the sensor, the sensor module retaining the sensors such that a face of each pf the sensors is at an angle to a face of the other sensor, the sensor module retaining the sensors such that the angle is an inward-facing angle;
a computing module for controlling the sensor module and analyzing the data from the sensor modules; and
a user feedback module for providing information to a user of a mobility device regarding the proximity of the mobility device to an object based on the data analyzed by the computing module.

17. The system of claim 16, wherein the sensor module further comprises more than two sensors.

18. The system of claim 16, wherein the two sensors of the sensor module are part of a set of at least three sensors, the system further comprising three groups of the sensors, each of the groups containing one or more sensors of the set of at least three sensors, a first of the three groups defining a left detection zone, a second of the three groups defining a right detection zone, and a third of the three groups defining a centre detection zone, the left, right, and centre detection zones covering an area about the sensor module, and wherein the user feedback module comprises a left light, a right light, and a centre light corresponding to the left, right, and centre detection zones, respectively.

19. The system of claim 16, wherein the two sensors of the sensor module are part of a set of at least three sensors, the system further comprising three groups of the sensors, each of the groups containing one or more sensors of the set of at least three sensors, a first of the three groups defining a left detection zone, a second of the three groups defining a right detection zone, and a third of the three groups defining a centre detection zone, the left, right, and centre detection zones covering an area about the sensor module, and wherein the user feedback module comprises a left vibration motor, a right vibration motor, and a centre vibration motor corresponding to the left, right, and centre detection zones, respectively.

20. The system of claim 16, wherein the ultrasonic transmit transducer and the ultrasonic receive transducer are separate transducers.

* * * * *

UNITED STATES PATENT AND TRADEMARK OFFICE
CERTIFICATE OF CORRECTION

| | | |
|---|---|---|
| PATENT NO. | : 11,243,301 B2 | Page 1 of 1 |
| APPLICATION NO. | : 16/317110 | |
| DATED | : February 8, 2022 | |
| INVENTOR(S) | : Pooja Viswanathan, Ilan Max and Graham Browning | |

It is certified that error appears in the above-identified patent and that said Letters Patent is hereby corrected as shown below:

In the Claims

Claim 16, Column 22, Line 36, "each pf the sensors ..." should read --each of the sensors--.

Signed and Sealed this
Second Day of August, 2022

Katherine Kelly Vidal
*Director of the United States Patent and Trademark Office*